United States Patent

Yoshino et al.

[11] Patent Number: 6,122,962
[45] Date of Patent: Sep. 26, 2000

[54] ANGULAR VELOCITY DETECTION ELEMENT AND ANGULAR VELOCITY MEASURING DEVICE

[75] Inventors: Shogo Yoshino; Mamoru Ishibe, both of Sagamihara; Tomio Shibano, Yokohama, all of Japan

[73] Assignee: Murata Manufacturing Co., Ltd., Japan

[21] Appl. No.: 09/031,980

[22] Filed: Feb. 26, 1998

[30] Foreign Application Priority Data

Feb. 28, 1997 [JP] Japan ................................... 9-062517
Sep. 12, 1997 [JP] Japan ................................... 9-268128

[51] Int. Cl.[7] ...................................................... G01P 9/04
[52] U.S. Cl. ........................................................ 73/504.14
[58] Field of Search ........................... 73/504.12, 504.14, 73/504.13, 504.15, 504.16

[56] References Cited

U.S. PATENT DOCUMENTS 5,419,194  5/1995  Varnham et al. ..................... 73/504.13
5,728,936  3/1998  Lutz ..................................... 73/504.12

Primary Examiner—John E. Chapman

[57] ABSTRACT

The angular velocity detection element includes: a substrate; a pair of spaced support bodies arranged on the substrate and having support-side electrodes that face each other; a movable body, disposed between the support bodies, having a pair of movable-side electrodes facing the support-side electrodes; and a vibration generator for vibrating the movable body in one direction. The support-side electrodes mounted on the support bodies and the movable-side electrodes that are mounted on the movable body are arranged such that the movable-side electrodes face the support-side electrodes. A pair of displacement detectors detect the displacement of the movable body in one direction when the vibration generator imparts a vibration in one direction to the movable body, and a pair of angular velocity detectors detect, as an angular velocity, a displacement perpendicular to the one direction in which the movable body vibrates when the angular velocity acts on the movable body.

8 Claims, 17 Drawing Sheets

ANGULAR VELOCITY DETECTION ELEMENT AND ANGULAR VELOCITY MEASURING DEVICE

BACKGROUND OF THE INVENTION

1. Field of the Invention

The present invention relates to an angular velocity detection element and an angular velocity measuring device suitable for detecting an angular velocity of a rotation member, for example.

2. Description of the Related Art

An angular velocity detection element for use in an angular velocity measuring device generally detects a Coriolis force in response to an angular velocity applied to the angular velocity detection element. For example, when an external angular velocity is applied around the Z axis of an angular velocity detection element under the condition that a movable body of the angular velocity detection element vibrates constantly in the X axis, a Coriolis force acts on the movable body in the Y axis perpendicular to the X axis. The displacement of the movable body caused by the Coriolis force is detected in a change in piezoelectric resistance or capacitance, and the magnitude of angular velocity is thus detected.

FIGS. 16 and 17 shows one example of a conventional angular velocity detection element disclosed in Japanese Laid-open Patent Publication No. 6-123632.

Shown here are the angular velocity detecting device 1 of the conventional art and a square-shaped substrate 2 that is the main body of the angular velocity detecting device 1, and the substrate 2 is manufactured of high-resistance silicon, for example.

Also shown are a pair of vibrating support bodies 3, 3 which are arranged on the substrate 2 to interpose a square movable body 7 between the left side and right side of the substrate 2, a pair of detecting support bodies 4, 4 which are arranged on the substrate 2 to interpose the moveable body 7 between the front side and rear side of the substrate 2 (between the top side and bottom side on the page of both FIGS. 16 and 17).

A pair of support-side vibrating electrodes 5,5 are arranged on the left-hand side and right-hand side as shown, and are integrally formed with and arranged to face the support bodies 3, 3. Four electrode plates 5A, 5A, . . . are projected from the respective support-side vibrating electrodes 5, 5 in a comb-shaped fashion.

Support-side detecting electrodes 6,6 are arranged on the upper side and lower side as shown, and are integrally formed with and arranged to face the support bodies 4, 4. Four electrode plates 6A, 6A, . . . are projected from the respective support-side detecting electrodes 6, 6.

The movable body 7 is manufactured of low-resistance polysilicon or single-crystal silicon, doped with P, B, Sb or the like, and the movable body 7 is supported on the substrate 2 with a spacing allowed between the movable body 7 and the top surface of the substrate 2 by its four support portions 8 on the substrate 2 near its four corners, and four support beams 9, each bent in an L-shaped configuration and having a portion extending in parallel in the X axis and a portion extending in parallel in the Y axis.

Since the movable body 7 is supported by its L-shaped support beams 9, the movable body 7 is displaced in the direction of the X axis when the portion of each beam 9 in parallel with the Y axis is deflected and the movable body 7 is displaced in the direction of the Y axis when the portion of each beam 9 in parallel with the X axis is deflected, and the movable body 7 is thus displaceable in both directions of the X axis and the Y axis. Furthermore, on its left-hand and right-hand sides as shown, the movable body 7 is integrally formed with movable-side vibrating electrodes 10, 10 to be described later, which are interdigitally engaged with the support-side vibrating electrodes 5, and on its upper side and lower side as shown, the movable body 7 is integrally formed with movable-side detecting electrodes 11, 11, which are interdigitally engaged with the support-side detecting electrodes 6.

Each of the movable-side vibrating electrodes 10, 10 is constructed of four electrode plates 10A arranged in a comb-like fashion on the left-hand and right-hand sides of the movable body 7 in the direction of the X axis, wherein the four electrode plates 10A are interdigitally engaged with the respective electrode plates 5A of each of the support-side vibrating electrodes 5 with a gap therebetween.

Each of the movable-side vibrating electrodes 11, 11 is constructed of four electrode plates 11A arranged in a comb-like fashion on the upper and lower sides of the movable body 7 in the direction of the Y axis, wherein the four electrode plates 11A are interdigitally engaged with the respective electrode plates 6A of each of the support-side detecting electrodes 6 with a gap therebetween.

Designated 12, 12 are vibration generators, and each of the vibration generators 12 is constituted by the support-side vibrating electrode 5 and the movable-side vibrating electrode 10, and equal gaps are formed between each electrode plate 5A of the support-side vibrating electrode 5 and each electrode plate 10A of the movable-side vibrating electrode 10.

When two driving signals which have a frequency f and opposite phases with each other and are generated by an oscillator (not shown) are applied to the vibration generators 12 on the left and right sides, respectively, an electrostatic attractive force takes place between the electrode plates 5A, 10A in the vibration generators 12 alternately on the left-hand side and on the right-hand side, and thus each of the vibration generators 12 repeats closing and parting actions. The movable body 7 thus vibrates in the direction of an arrow a in alignment with the X axis.

Designated 13, 13 are angular velocity detectors, and each angular velocity detector 13 is constituted by the support-side detecting electrode 6 and movable-side detecting electrode 11, and equal gaps are formed between each electrode plate 6A of the support-side detecting electrode 6 and each electrode plate 11A of the movable-side detecting electrode 11. The support-side detecting electrodes 6, 11 are constructed as a plane-parallel capacitor, and each angular velocity detector 13 detects, as a change in capacitance, a change in effective area between the electrode plates 6A and 11A.

When the driving signals of opposite phase of frequency f are applied to the vibration generators 12 in the angular velocity detection element 1 thus constructed, an electrostatic attractive force takes place between the electrode plates 5A and 10A alternately between the left-hand vibration generator 12 and the right-hand vibration generator 12, and the movable body 7 vibrates in the direction of the arrow a in alignment with the X axis due to repeated electrode closing and parting actions.

When an angular velocity P acts on the angular velocity detection element 1 about the Z axis with the movable body 7 vibrating, a Coriolis force (inertia) is generated in the direction of the Y axis, and the movable body 7 is displaced in the direction of the Y axis under a Coriolis force F as expressed in equation 2 below.

When the vibration generator 12 displaces the movable body 7 in the X axis, a displacement x and a velocity V are as expressed in equation 1.

$$x = A \sin \omega_1 t \quad \text{[Equation 1]}$$

$$V = A \omega_1 \cos \omega_1 t$$

where A: Amplitude of the movable body 7

$\omega_1$: Angular frequency of driving mode t: Time

When an angular velocity $\Omega$ is applied about the Z axis with the movable body 7 displaced by a displacement x in the direction of the X axis at a velocity of V, a Coriolis force F takes place in the direction of Y axis as expressed in equation 2.

$$F = 2m\Omega V \quad \text{[Equation 2]}$$

where m: Mass of the movable body 7

$\Omega$: Angular velocity

The movable body 7, under the Coriolis force F expressed in equation 2, vibrates in the direction of the Y axis, and the angular velocity detector 13 detects the displacement of the movable body 7 as a change in capacitance between the movable-side detecting electrodes 11 and the support-side detecting electrodes 6, and thus detects the angular velocity $\Omega$ about the Z axis.

Since each vibration generator 12 is constituted by the support-side vibrating electrode 5 having the electrode plates 5A and the movable-side vibrating electrode 10 having the electrode plates 10A, large facing effective areas are assured between the electrodes 5 and 10. When the driving signals are fed to the vibration generators 12, the electrostatic attractive force taking place between the electrode plates 5A and the corresponding electrode plates 10A becomes large enough to vibrate greatly the movable body 7 in the direction of the arrow a.

In addition, since each angular velocity detector 13 is also constituted by the support-side detecting electrode 6 having the electrode plates 6A and the movable-side detecting electrode 11 having the electrode plates 11A, large facing effective areas are assured between the detecting electrodes 6 and 11. Each angular velocity detector 13 detects the displacement of the movable body 7 in the direction of the Y axis in the form of a change in capacitance arising from a change in the effective areas between the electrode plates 6A and the corresponding electrode plates 11A.

As is clear from equations 1 and 2, the Coriolis force F is proportional to the velocity V of the movable body 7 in the angular velocity detection element 1, and the velocity V of the movable body 7 is proportional to the amplitude of the movable body 7. It is easy to understand that the detection sensitivity of the angular velocity detection element 1 is enhanced as the amplitude of vibration of the movable body 7 gets larger. For this reason, in the angular velocity detection element 1 of the conventional art, the frequency f of the driving signal output by the oscillator circuit is set to coincide with the natural oscillation frequency of the angular velocity detection element 1 so that the movable body 7 vibrates at resonance.

However, since the angular velocity detection element 1 of the conventional art is so complicated as described above, the natural oscillation frequencies of the angular velocity detection elements 1 as manufactured do not have equal values because of manufacturing errors or the like. For this reason, when the angular velocity detection element 1 is connected to the oscillator circuit, an adjusting step is required on an individual basis so that the frequency of the driving signal output by the oscillator circuit is adjusted to match the natural oscillation frequency of the angular velocity detection element 1.

Furthermore, in the angular velocity detection element of the conventional art, even if the frequency of the output from the oscillation means matches the natural oscillation frequency of the angular velocity detection element 1, the detection sensitivity of an angular velocity measuring device is substantially degraded when the natural oscillation frequency of the angular velocity detection element 1 changes because of aging or the like.

For the aforementioned reasons, there arises a demand for an angular velocity detection element and an angular velocity measuring device, which can realize constant vibration of a movable body at a resonance frequency.

SUMMARY OF THE INVENTION

The preferred embodiments of the present invention provides an angular velocity detection element and a angular velocity measuring device that satisfy the aforementioned demand. The angular velocity detection element comprises a substrate, a pair of spaced support bodies arranged on the substrate and having at least a pair of support-side electrodes that face each other, a movable body, disposed between the support bodies, having at least a pair of movable-side electrodes facing the support-side electrodes, and a vibration generator for vibrating the movable body in one direction.

The pair of support-side electrodes mounted on the support bodies and the pair of movable-side electrodes that are mounted on the movable body are structured and arranged such as to constitute a pair of displacement detectors which detects the displacement of the movable body in one direction when the vibration generator imparts a vibration in one direction to the movable body, and to constitute a pair of angular velocity detectors for detecting, as an angular velocity, a displacement perpendicular to the one direction in which the movable body vibrates when an angular velocity acts on the movable body.

With this arrangement, the movable body vibrates in one direction when an external driving signal is applied to the vibration generator, and when an angular velocity acts under this condition, Coriolis force takes place, displacing the movable body in a direction perpendicular to the direction of vibration.

Based on a displacement signal output by each displacement detector, the displacement of the movable body vibrated in one direction by the vibration generator is detected. On the other hand, an angular velocity signal output by each angular velocity detector, the displacement of the movable body in the perpendicular direction caused by Coriolis force is detected. Since the detected signal by the angular velocity detector includes the displacement signal and the angular velocity signal, the angular velocity signal and the displacement signal are separately output.

The displacement detector may detect the displacement of the movable body, based on a change in capacitance between the support-side electrodes and the movable-side electrodes when an effective area between the support-side electrodes and the movable-side electrodes or a gap between the support-side electrodes and the movable-side electrodes changes, and the angular velocity detector detects the angular velocity based on a change in capacitance between the support-side electrodes and the movable-side electrodes when an effective area between the support-side electrodes and the movable-side electrodes or a gap between the support-side electrodes and the movable-side electrodes changes.

With the above arrangement, each displacement detector detects the displacement of the movable body in one direction as a capacitance arising from a change in the effective area between the electrodes or the gap between the electrodes, and each angular velocity detector detects the displacement of the movably body in the perpendicular direction as a capacitance arising from a change in the gap between the electrodes or the effective area between the electrodes.

With the movable body being vibrated in one direction, the displacement signal output by each displacement detector increases or decreases while the angular velocity signal output by each angular velocity detector remains unchanged, and with the movable body displaced in a perpendicular direction, the angular velocity signal output by each angular velocity detector increases or decreases in accordance with this displacement while the displacement signal output by each displacement detector remains unchanged.

The support-side electrode may be constructed, in an antenna-like configuration, of a plurality of posts extending from the support body in a direction perpendicular to the support body, and a plurality of electrode plates, each extending in one direction from both sides of each post, and the movable-side electrode is constructed, in an antenna-like configuration, of a plurality of posts that extend in the direction of the same axis as the respective posts of the support-side electrode, and a plurality of electrode plates, each extending from both sides of each post, and facing the respective electrode plates of the support-side electrode with a gap therebetween.

With this arrangement, the displacement detector detects, as the displacement signal, the displacement of the movable body in one direction based on a change in capacitance of the effective area between the movable-side electrode and the support-side electrode, both in antenna-like configuration, and the angular velocity detector detects, as the angular velocity signal, the displacement of the movable body in the perpendicular direction, based on a change in capacitance arising from the gap between the movable-side electrode and the support-side electrode, both in antenna-like configuration.

Both displacement detectors are paired with respect to the movable body, and both angular velocity detectors are paired with respect to the movable body, and by allowing each displacement detector to output the displacement signal, the driving signal and the angular velocity signal contained in detected signal provided by the angular velocity detection element are separately output.

The angular velocity measuring device according to the present invention may comprise an angular velocity detection element which detects, in the form of a change in capacitance, a displacement in a direction perpendicular to a direction of vibration of a movable body when an external angular velocity acts with the movable body vibrated in one direction relative to a support body; oscillating means for outputting a driving signal having a frequency corresponding to a control signal in order to impart a vibration in one direction to the movable body of the angular velocity detection element; displacement computing means for computing the displacement of the movable body based on the change in capacitance taking place in the angular velocity detection element with the oscillating means imparting the vibration in one direction to the movable body of the angular velocity detecting means; angular velocity computing means for computing the magnitude of angular velocity acting on the movable body based on the change in capacitance taking place in the angular velocity detection element when the angular velocity acts on the angular velocity detection element; multiplying means for multiplying a displacement signal and the driving signal in order to compute a phase difference therebetween, wherein the displacement signal is output by the displacement computing means and the driving signal is output by the oscillating means; and frequency control means for outputting the control signal for controlling the frequency of the driving signal in response to the inputting of a multiplied signal from the multiplying means so that a phase difference of 90 degrees takes place between the driving signal output by the oscillating means and the displacement signal output by the displacement computing means.

With this arrangement, the movable body in the angular velocity detection element, driven by the driving signal output by the oscillating means, vibrates in the one direction. When an angular velocity then acts on the angular velocity detection element, Coriolis force displaces the movable body in the perpendicular direction. The angular velocity computing means computes a change in capacitance arising from the displacement of the movable body in the perpendicular direction, as output by the angular velocity detection element, in order to obtain the angular velocity signal.

The displacement computing means determines a change in capacitance arising from the displacement of the movable body due to vibration taking place in the one direction in the angular velocity detection element. The multiplying means multiplies the displacement signal output by the displacement computing means by the driving signal output by the oscillating means to compute a phase difference therebetween, as a multiplied signal. In response to the multiplied signal output by the multiplying means, the frequency control means makes the displacement signal shift from the driving signal in phase by 90 degrees to control the frequency of the driving signal output by the oscillating means.

In this way the frequency control means performs feedback control, sets the phase difference between the driving signal and the displacement signal to be 90°, makes the frequency of the driving signal output by the oscillating means match the natural oscillation frequency of the angular velocity detection element, and vibrates the movable body of the angular velocity detection element at resonance.

The oscillating means may comprise a voltage-controlled oscillator circuit which varies the frequency of the driving signal output to the angular velocity detection element in response to the control signal output by the frequency control means, and the frequency control means comprises an integrating circuit for integrating the multiplied signal output by the multiplying means, and a control signal setting circuit for determining whether an integrated signal output by the integrating circuit is zero, for setting, as the control signal, a preset reference signal that causes a phase difference of 90 degrees between the driving signal and the displacement signal when the integrated signal is zero, and for setting, as the control signal, a value that is obtained by performing addition or subtraction between the integrated signal and the reference signal when the integrated signal is not zero.

With this arrangement, the integrating circuit converts the multiplied signal output by the multiplying means into a direct current, and the control signal to be fed to the voltage-controlled oscillator circuit is set by the control signal setting circuit to be the preset reference signal that causes a phase difference of 90 degrees between the driving signal and the displacement signal when the integrated signal is zero, and is set by the control signal setting circuit to be the value that is obtained by performing addition or subtraction between the integrated signal and the reference signal when the integrated signal is not zero. In this way, feedback control is performed so that the frequency of the driving signal output by the oscillating means matches the natural oscillation frequency of the angular velocity detection element, and so that the movable body of the angular velocity detection element vibrates at resonance.

The angular velocity detection element may comprise a substrate, a pair of spaced support bodies arranged on the substrate and having support-side electrodes that face each other, a movable body, disposed between the support bodies, having a pair of movable-side electrodes facing the support-side electrodes, and a vibration generator for vibrating the movable body in one direction.

With this arrangement, the movable body vibrates in one direction when an external driving signal is applied from the oscillating means to the vibration generator, and when an angular velocity acts about the vertical axis under this condition, Coriolis force takes place, displacing the movable body in a direction perpendicular to the direction of vibration. The displacement of the movable body in the direction perpendicular to the one direction is detected based on a change in capacitance between the support-side electrode and the movable-side electrode.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWINGS

FIG. 5 is a plan view showing the state in which the movable body vibrates in the direction of the arrow a.

DETAILED DESCRIPTION OF PREFERRED EMBODIMENTS

Hereinafter, the preferred embodiments of the present invention are explained in detail with reference to the drawings.

Figure 1:
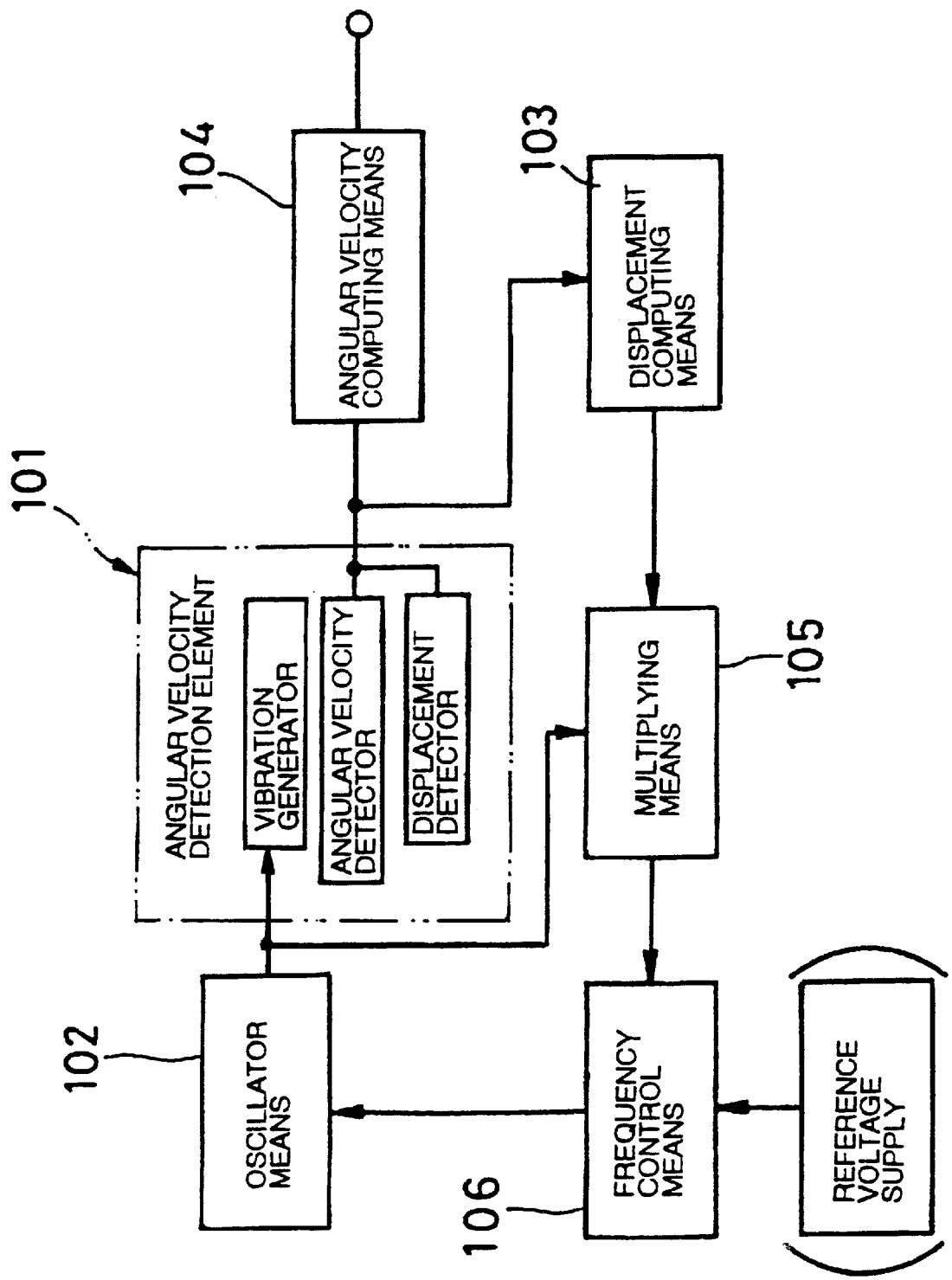
FIG. 1 is a functional block diagram broadly showing an angular velocity measuring device according to the present invention.

First, with reference to the functional block diagram shown in FIG. 1, the angular velocity measuring device according to the present invention will be broadly described. As shown in FIG. 1, the angular measuring device comprises an angular velocity detection element 101 which detects, in the form of a change in capacitance, a displacement in a direction perpendicular to a direction of vibration of a movable body when an external angular velocity acts with the movable body vibrated in one direction relative to a support body; oscillating means 102 for outputting a driving signal having a frequency corresponding to a control signal in order to impart a vibration in one direction to the movable body of the angular velocity detection element 101; displacement computing means 103 for computing the displacement of the movable body based on the change in capacitance taking place in the angular velocity detection element 101 with the oscillating means 102 imparting the vibration in one direction to the movable body of the angular velocity detecting means 101; angular velocity computing means 104 for computing the magnitude of angular velocity acting on the movable body based on the change in capacitance taking place in the angular velocity detection element 101 when the angular velicty acts on the angular velocity detection element 101; multiplying means 105 for mutiplying a displacement signal and the driving signal in order to compute a phase difference therebetween, wherein the displacement signal is output by the displacement computing means 103 and the driving signal is output by the oscillating means 102; and frequency control means 106 for outputting the control signal for controlling the frequency of the driving signal in response to the inputting of a multiplied signal from the multiplying means 105 so that a phase difference of 90 degrees takes place between the driving signal output by the oscillating means 102 and the displacement signal output by the displacement computing means 103.

With this arrangement, the movable body in the angular velocity detection element 101, driven by the driving signal output by the oscillating means 102, vibrates in the one direction. When an angular velocity then acts on the angular velocity detection element 101, Coriolis force displaces the movable body in the perpendicular direction. The angular velocity computing means 104 computes a change in capacitance arising from the displacement of the movable body in the perpendicular direction, as output by the angular velocity detection element 101, in order to obtain the angular velocity signal.

The displacement computing means 103 determines a change in capacitance arising from the displacement of the movable body due to vibration taking place in the one direction in the angular velocity detection element 101. The multiplying means 105 multiplies the displacement signal output by the displacement computing means 103 by the driving signal output by the oscillating means 102 to compute a phase difference therebetween, as a multiplied signal. In response to the multiplied signal output by the multiplying means 105, the frequency control means 106 makes the displacement signal shift from the driving signal in phase by 90 degrees to control the frequency of the driving signal output by the oscillating means 102.

In this way the frequency control means 106 performs feedback control, sets the phase difference between the driving signal and the displacement signal to be 90°, makes the frequency of the driving signal output by the oscillating means 102 match the natural oscillation fequency of the angular velocity detection element 101, and vibrates the movable body of the angular velocity detection element 101 at resonance.

The embodiments of the present invention will now be discussed in greater detail with reference to FIGS. 2 through 15. Components identical to those described in connection with the above-described conventional art are designated with the same reference numerals, and their description is not repeated.

Figure 2:
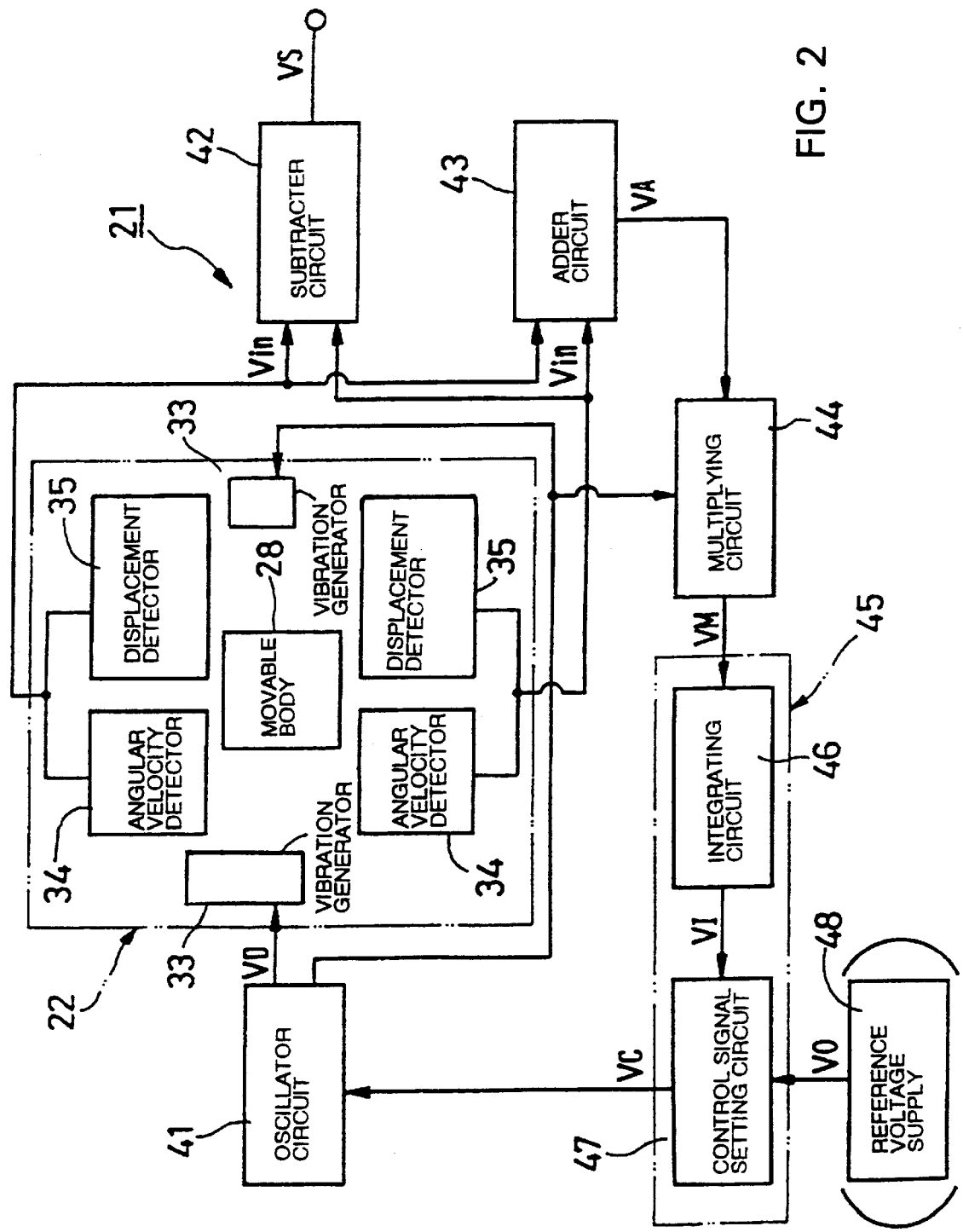
FIG. 2 is a block diagram showing the angular velocity measuring device according to an embodiment of the present invention.

Referring to FIG. 2, the angular velocity measuring device 21 according to one embodiment of the present invention comprises an angular velocity detection element 22, and components including a oscillator circuit, 41 connected to a frequency control circuit 45 to be described later for controlling the angular velocity detection element 22.

Referring to FIGS. 3 through 6, the angular velocity detection element used in the embodiment is discussed.

There are shown the angular velocity detection element 22 and a rectangular substrate that is a body of the angular velocity detection element 22, and the substrate 23 is manufactured of high-resistance silicon.

A pair of vibrating support bodies 24, 24 are arranged on the substrate 23 so that a movable body 28 to be described later is interposed between both bodies 24, 24 from left and right. A pair of detecting support bodies 25, 25 are arranged on the substrate 23 such that the movable body 28 is interposed between both support bodies 25, 25 from front and back (from upper and lower sides on the pages of FIGS. 3 through 6). Each support body 25 is provided with a base portion 25A that is extended along the X axis. A comb-shaped support-side electrode 26 to be described later is integrally formed with each support body 24, and a support-side antenna-like electrode 27 is integrally formed with the base portion 25A of each support body 25.

The support-side comb-shaped electrodes 26, 26 are constructed of a plurality of electrode plates 26A extended from the vibrating support bodies 24, 24 arranged on the substrate 23 on its both left-hand and right-hand side.

The support-side antenna-like electrodes 27, 27, . . . constitute a support-side antenna-like electrode group, and are arranged at regular intervals along the longitudinal direction of the base portion 25A, and each is constructed of a post 27A extending in the direction of Y axis, and a plurality of electrode plates 27B, each extending leftward and rightward from the post 27A. The support-side antenna-like electrode 27 arranged on the left-most of the base portion 25A has electrode plates 27B on its right-hand side only of the post 27A.

The movable body 28 arranged on the substrate 23 has a generally H-shaped configuration and is manufactured of low-resistance silicon, single-crystal silicon or the like, and is supported by its four support portions 29 rigidly attached onto the substrate 23 at its four corner, and by its four horizontally aligned U-shaped beams 30 connected to the respective support portions 29. The movable body 28 is thus displaceably supported by the beams 30 in the one direction in alignment with the X axis and in the perpendicular direction in alignment with the Y axis in a state that keeps the movable body 28 spaced from the top surface of the substrate 23.

The movable body 28 has two bar-like portions 28A, 28A which extend in the direction of Y axis, and the ends of which are connected to the respective beams 30, and the movable body 28 also has a connecting portion 28B that extends in the direction of the X axis to connect both bar-like portions 28A at their middle positions. Comb-shaped electrodes 31, 31, . . . which are interdigitally engaged with the support-side comb-shaped electrodes 26, as will be described later, are integrally formed with the bar-like portions 28A of the movable body 28 on their external sides, and a plurality of antenna-like electrodes 32 which are interdigitally engaged with the support-side antenna-like electrodes 27 are integrally formed with the connecting portion 28B on its both side.

The movable-side comb-shaped electrodes 31, 31, . . . are constructed of a plurality of electrode plates 31A which extend externally in the direction of the X axis from the bar-like portions 28A, 28A of the movable body 28 so that the electrode plates 31A face the electrode plates 26A of the support-side comb-shaped electrodes 26, respectively.

The movable-side antenna-like electrodes 32, 32, . . . form the movable-side antenna-like electrode group, and have posts 32A that extend in the direction of Y axis at regular intervals from both sides of the connecting portion 28B of the movable body 28 to face the support-side antenna-like electrode plates 27, and a plurality of electrode plates 32B arranged on both sides of each post 32A. The movable-side antenna-like electrode 32 arranged on the left-most of the connecting portion 28B has a post 32A that is provided with right-hand side electrodes 32B only.

Figure 3:
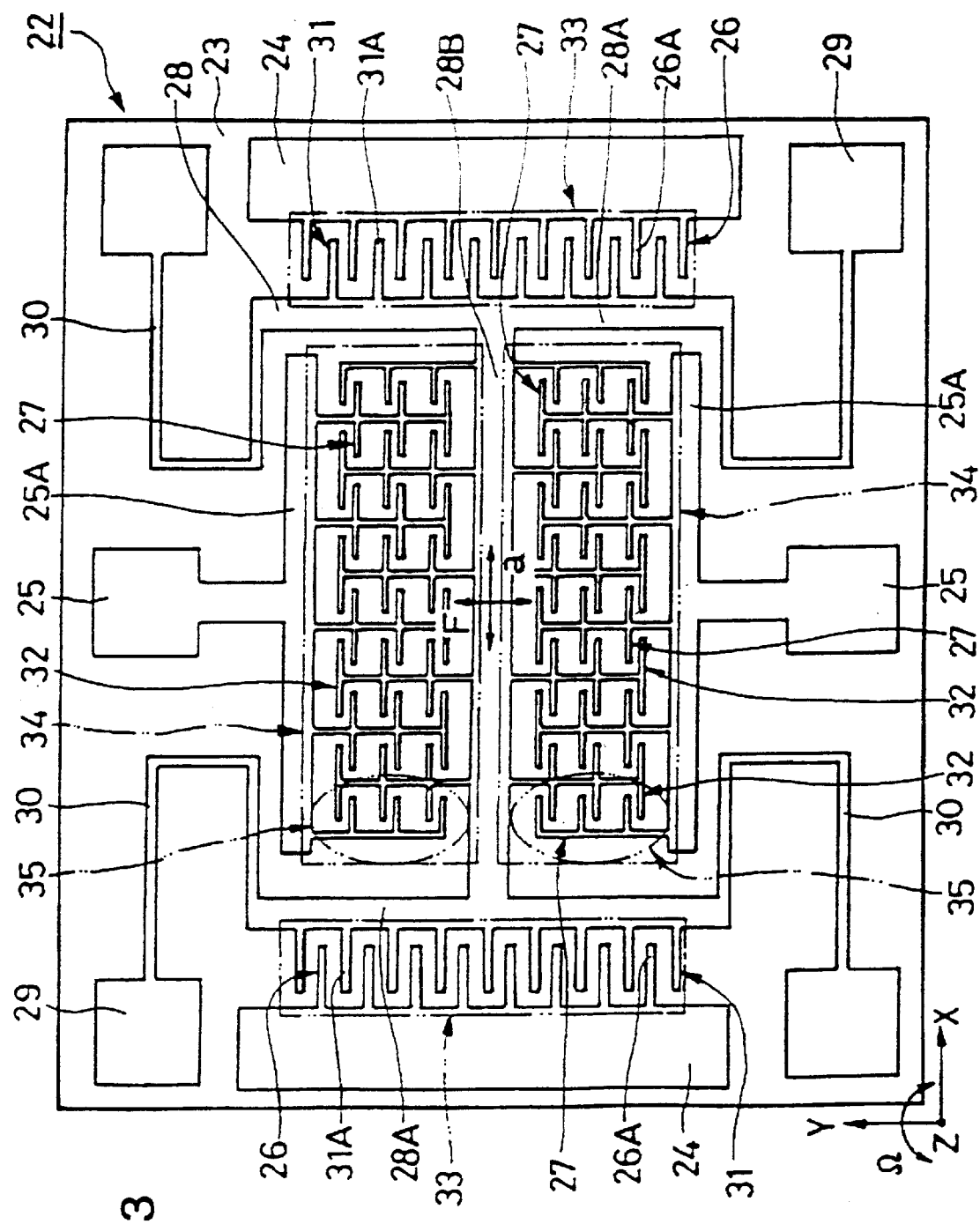
FIG. 3 is a plan view showing the construction of the angular velocity detection element.

Designated 33, 33 are vibration generators, and each vibration generator 33 is constructed of one support-side comb-shaped electrode 26 and one movable-side comb-shaped electrode 31, and equal gaps are left between the electrode plates 26A of the support-side comb-shaped electrode 26 and the respective electrode plates 31A of the movable-side comb-shaped electrode 31 as shown in FIG. 3. When an oscillator circuit 41 (FIG. 2) applies a driving signal VD of a frequency f of anti-phase between the support-side comb-shaped electrode 26 and the movable-side comb-shaped electrode 31, electrostatic attractive force takes place alternately between the electrode plates 26A and 31A to vibrate the movable body 28 in the direction of an arrow a.

Designated 34, 34 are angular velocity detectors, and each angular velocity detector 34 is formed in surrounded areas defined by the bar-like portions 28A and the connecting portion 28B of the movable body 28, and is constructed of the support-side antenna-like electrode plates 27 constituting the support-side antenna-like electrode group and the plurality of movable-side antenna-like electrodes 32 constituting the movable-side antenna-like electrode group.

Figure 4:
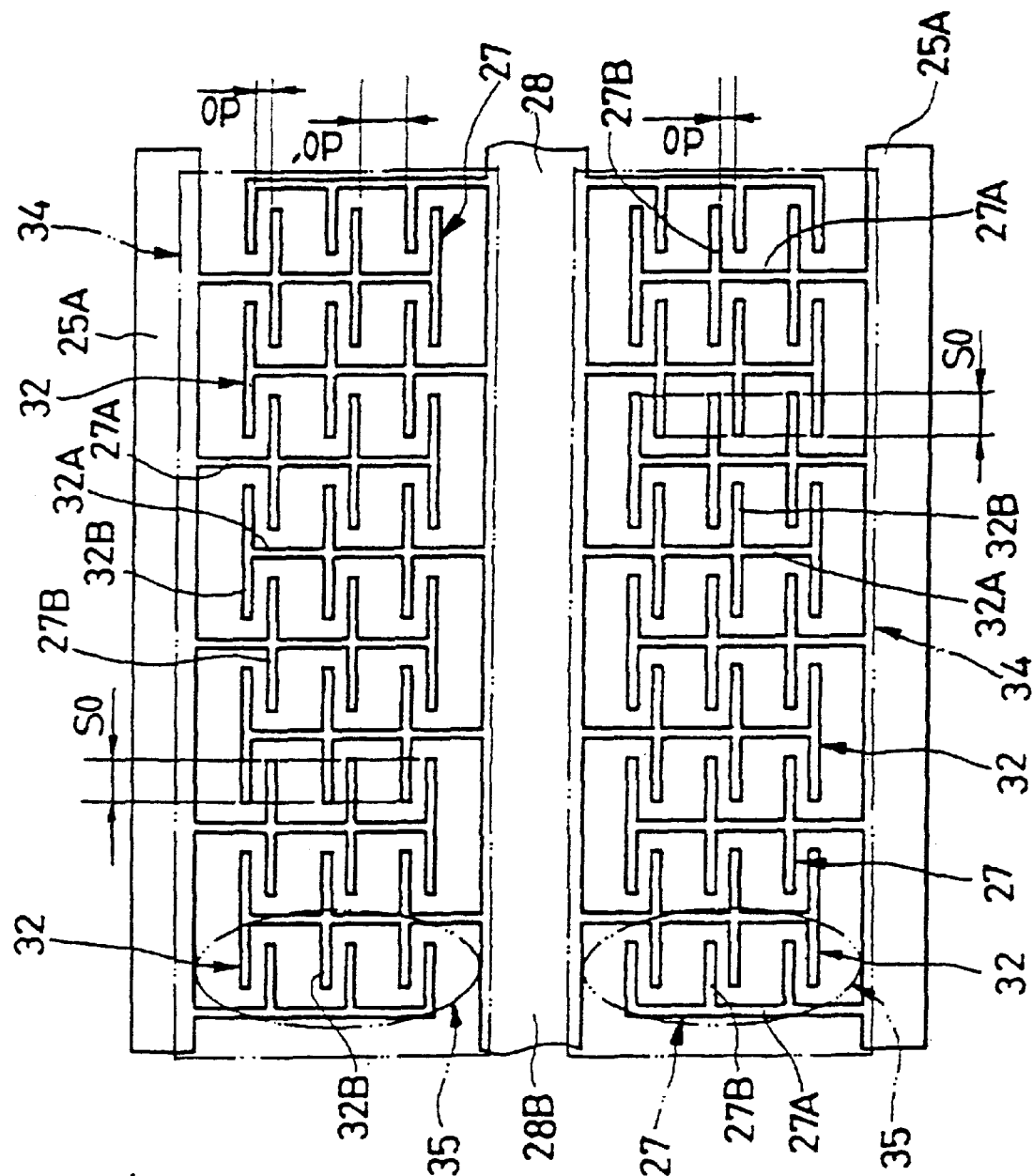
FIG. 4 is an enlarged plan view showing the angular velocity detector and the displacement detector of the angular velocity detection element.

Referring to FIG. 4, when the electrode plates 27B constituting the support-side antenna-like electrodes 27 and the electrode plates 32B constituting the movable-side antenna-like electrodes 32 are interdigitally engaged, an initial effective area between adjacent electrode plates 27B and 32B is S0, and initial gaps alternate between a narrow gap d0 and a wide gap d0'. In this case, the gaps d0 and d0' are bilaterally symmetrical about the connecting portion 28B between above and below it.

In the initial state, the relationship between capacitance C0 of a plane-parallel capacitor of the narrow gap d0 and capacitance C0' of a plane-parallel capacitor of the wide gap d0' are expressed in equation 3.

$$C0 >> C0' \qquad \text{[Equation 3]}$$

When the angular velocity detector 34 is inoperative at the initial state, the plane-parallel capacitor is constituted by the narrow gap d0 only. As a result, when an external force acts on the angular velocity detection element 22, the displacement of the movable body 28 in the direction of Y axis is detected as a change in capacitance contributed by the narrow gap d0.

Designated 35, 35 are displacement detectors, and each displacement detector 35 is constituted by the support-side antenna-like electrode 27 on the leftmost of the base portion 25A and the movable-side antenna-like electrode 32 on the leftmost of the connecting portion 28B, and detects the displacement of the movable body 28 in the direction of the arrow a (FIG. 3) in accordance with a detection operation as will be described later while also functioning as the angular velocity detector 34 for detecting the displacement of the movable body 28 in the direction of F.

Figure 5:
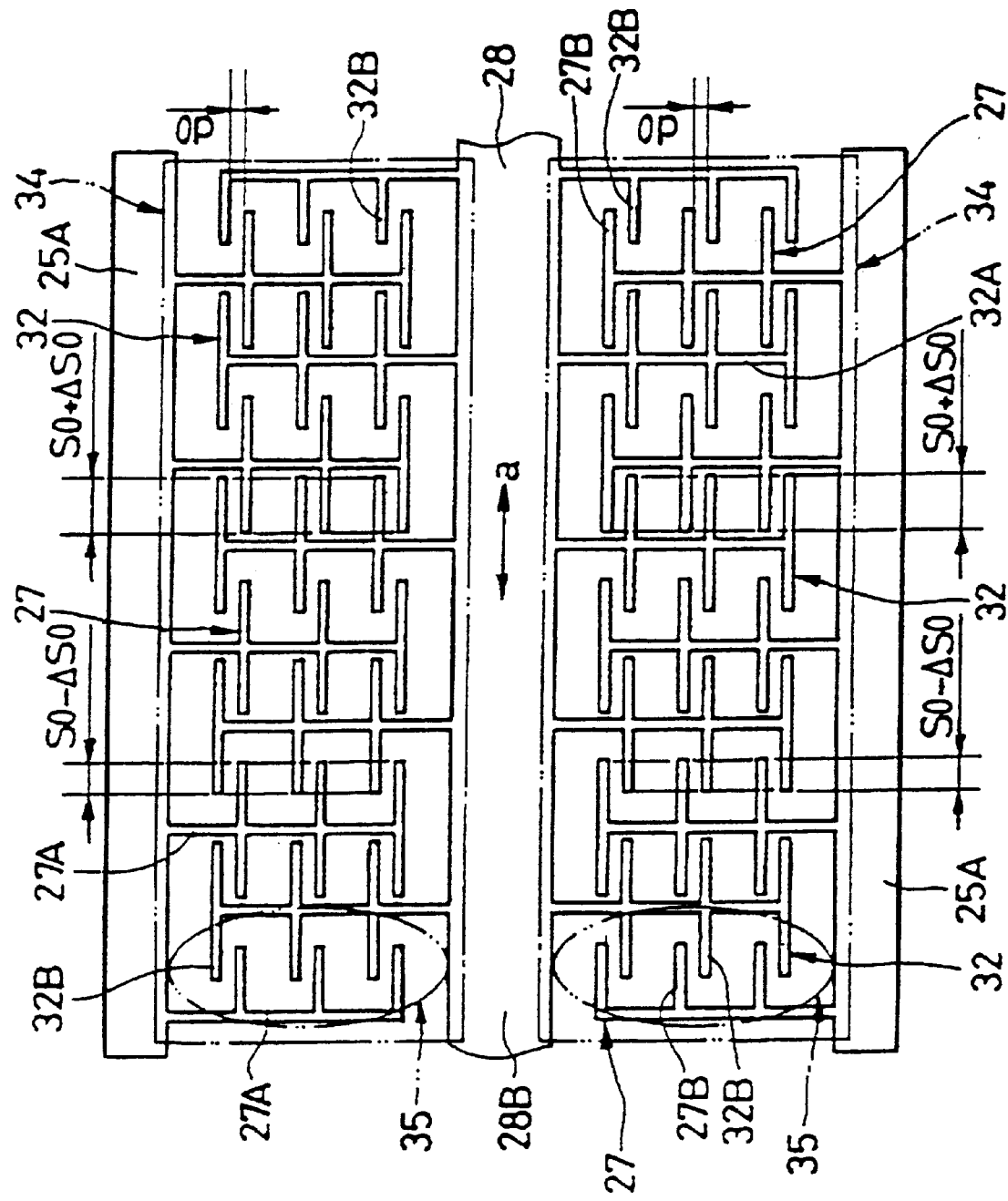
Figure 6:
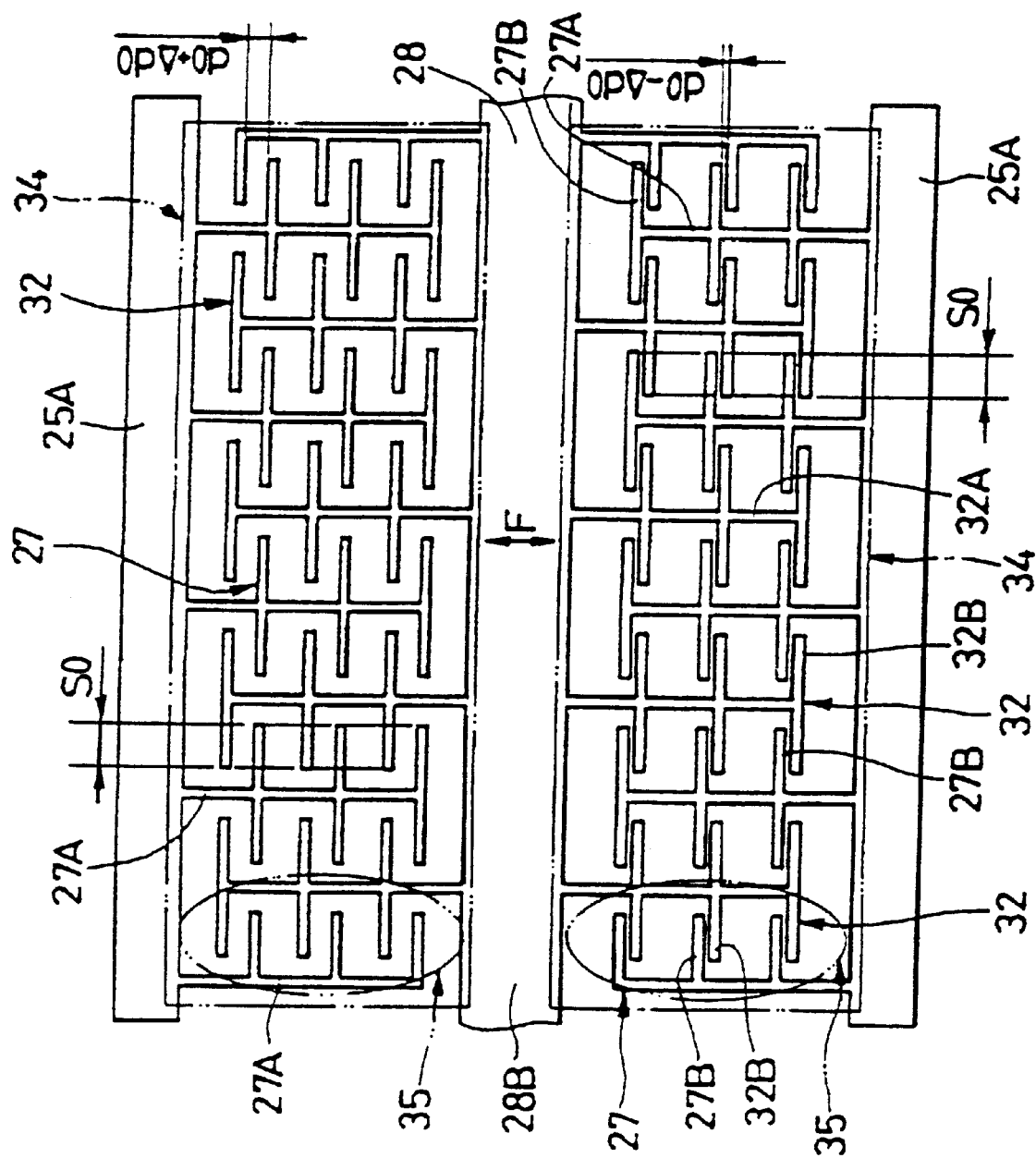
FIG. 6 is a plan view showing the state in which the movable body vibrates in the direction of the arrow F.

Referring to FIGS. 4 through 6, the detection operation of the angular velocity detectors 34 and the displacement detectors 35 will now be discussed.

When the driving signal VD is not applied to the vibration generators 33 in the initial state, the effective area between adjacent electrode plates 27B and 32B in each angular velocity detector 34 is S0, and the gaps between the adjacent electrode plates 27B and 32B alternate between the narrow gap d0 and wide gap d0' as shown in FIG. 4.

When the driving signal VD is applied to the vibration generators 33, the movable body 28 vibrates in the direction of the arrow a in alignment with the X axis as shown in FIG. 5. The gaps d0 and d0' between the adjacent electrode plates 27B and 32B in the angular velocity detector 34 remain unchanged, but the effective area S0 changes.

Now one support-side antenna-like electrode 27 of the angular velocity detector 34 is considered, and in connection with the electrode plates 27B on the left-hand side and right-hand side of the post 27A, the effective area S0 between the electrode plates 27B and the electrode plates 32B of the movable-side antenna-like electrode 32 is decreased by a change in area ΔS0 on the right-hand side of the post 27A and is increased by a change in area ΔS0 on the left-hand side of the post 27A.

Capacitance C on the left-hand and right-hand sides of the post 27A is decreased by a change in capacitance −ΔC1 and increased by a change in capacitance +ΔC1, wherein both cancel each other in the one support-side antenna-like electrode 27. As a result, the angular velocity signal detected by the angular velocity detector 34 between the support bodies 25 and the movable body 28 includes no displacement arising from the vibration of the movable body 28 in the direction of the arrow a.

The displacement detector 35 is now considered, and since each displacement detector 35 is constituted by the left-most support-side antenna-like electrode 27 and the left-most movable-side antenna-like electrode 32, both displacement signals output by the displacement detectors 35, one above and the other below the connecting portion 28B are detected as decreased by a change in capacitance −ΔC2 with the effective area S0 reduced by decrement area of ΔS0 in each signals, when the movable body 28 is displaced in the direction of a as shown in FIG. 5. In this way, the displacement of (2×−ΔC2) is detected by adding the displacement signals output by the displacement detector 35 through an adder circuit 43 to be described later.

When an external force acts on the angular velocity detection element 22, the movable body 28 is displaced in the direction of F as shown in FIG. 6, the effective area S0 between the electrode plates 27B and 32B in each angular velocity detector 34 remains unchanged, and the detection operation is performed using the narrow gap d0 only.

The upper and lower angular velocity detectors 34 with respect to the connecting portion 28B are now considered, and in the upper angular velocity detector 34, the gap d0 between the electrode plates 27B and 32B is increased by a change in gap Δd0, resulting in a displacement signal having the effect of change in capacitance (−ΔC3). In the lower angular velocity detector 34, on the other hand, the gap d0 between the electrode plates 27B and 32B is decreased by a change in gap Δd0, resulting in a displacement signal having the effect of change in capacitance (+ΔC3). The displacement signal of (2×−ΔC3) is detected by subtracting the angular velocity signals output by the angular velocity detectors 34 through a subtracter circuit 42. Each displacement detector 35 functions in the same way as the angular velocity detector 34.

As described above, the angular velocity detection element 22 thus detects the vibration of the movable body 28 in the direction of an arrow a through the displacement detectors 35 and the displacement of the movable body 28 in the direction of the arrow F through the angular velocity detectors 34. Besides these signals, the angular velocity detection element 22 detects, as a detected signal Vin for the upper side, a change in capacitance between the upper support body 25 and the movable body 28, and detects, as a detected signal Vin for the lower side, a change in capacitance between the lower support body 25 and the movable body 28.

Figure 7:
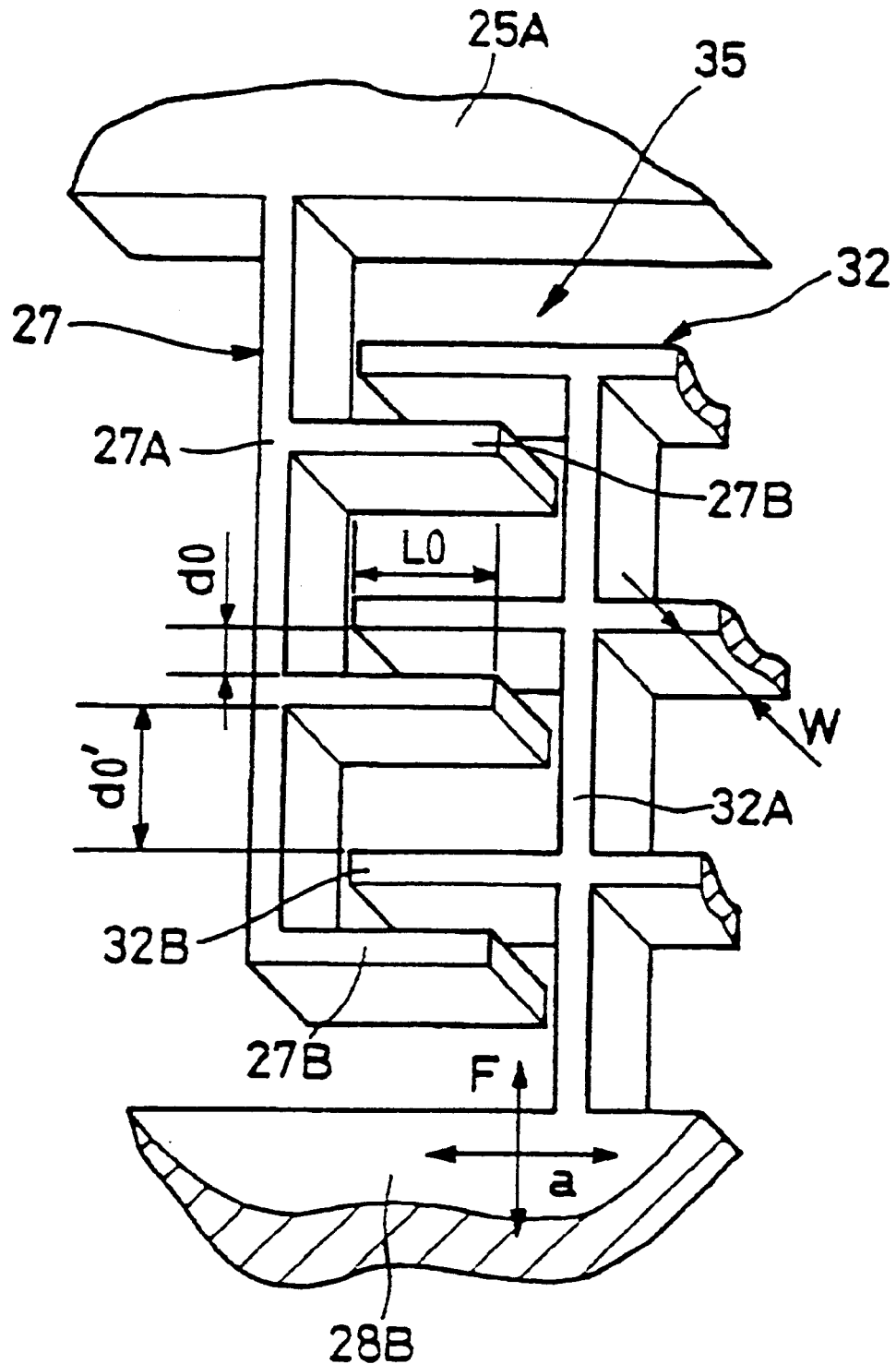
FIG. 7 is an enlarged perspective view showing the displacement detector.
Figure 8:
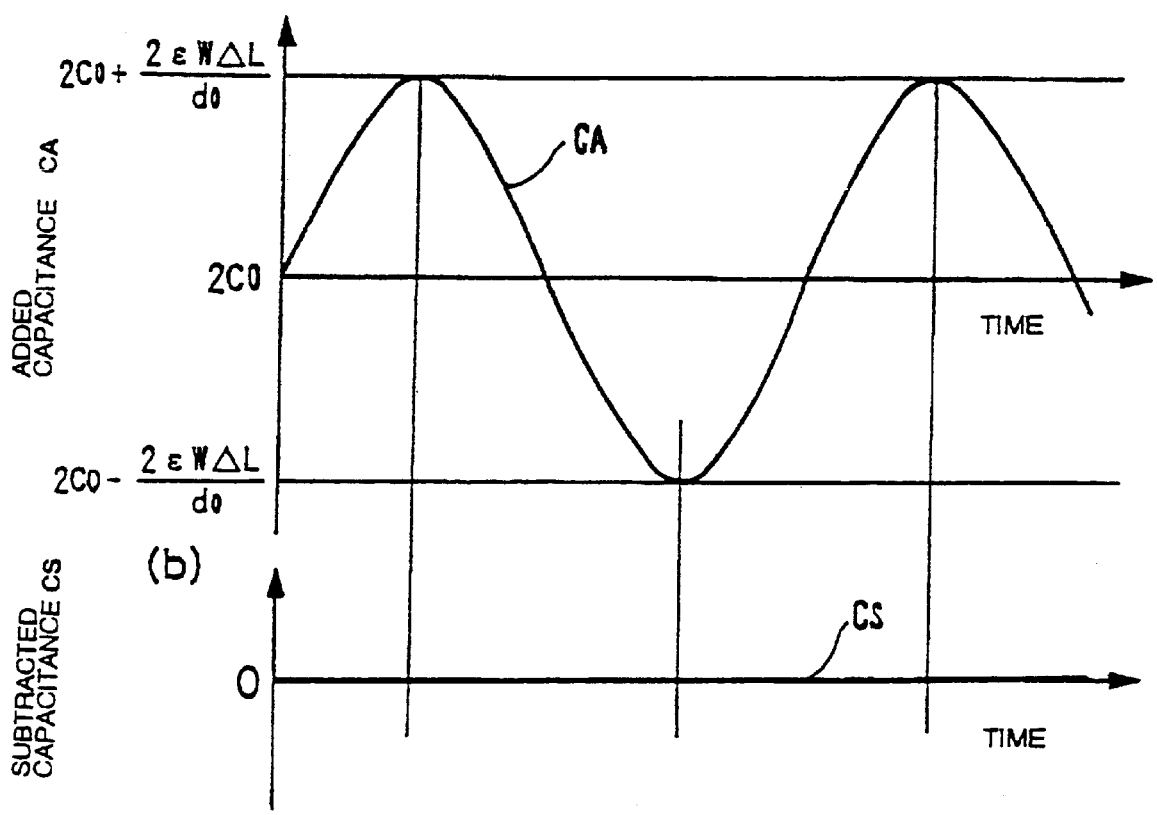
FIG. 8 is a waveform diagram showing the added capacitance and the subtracted capacitance detected by the displacement detector when the movable body vibrates in the direction of the arrow a only.
Figure 9:
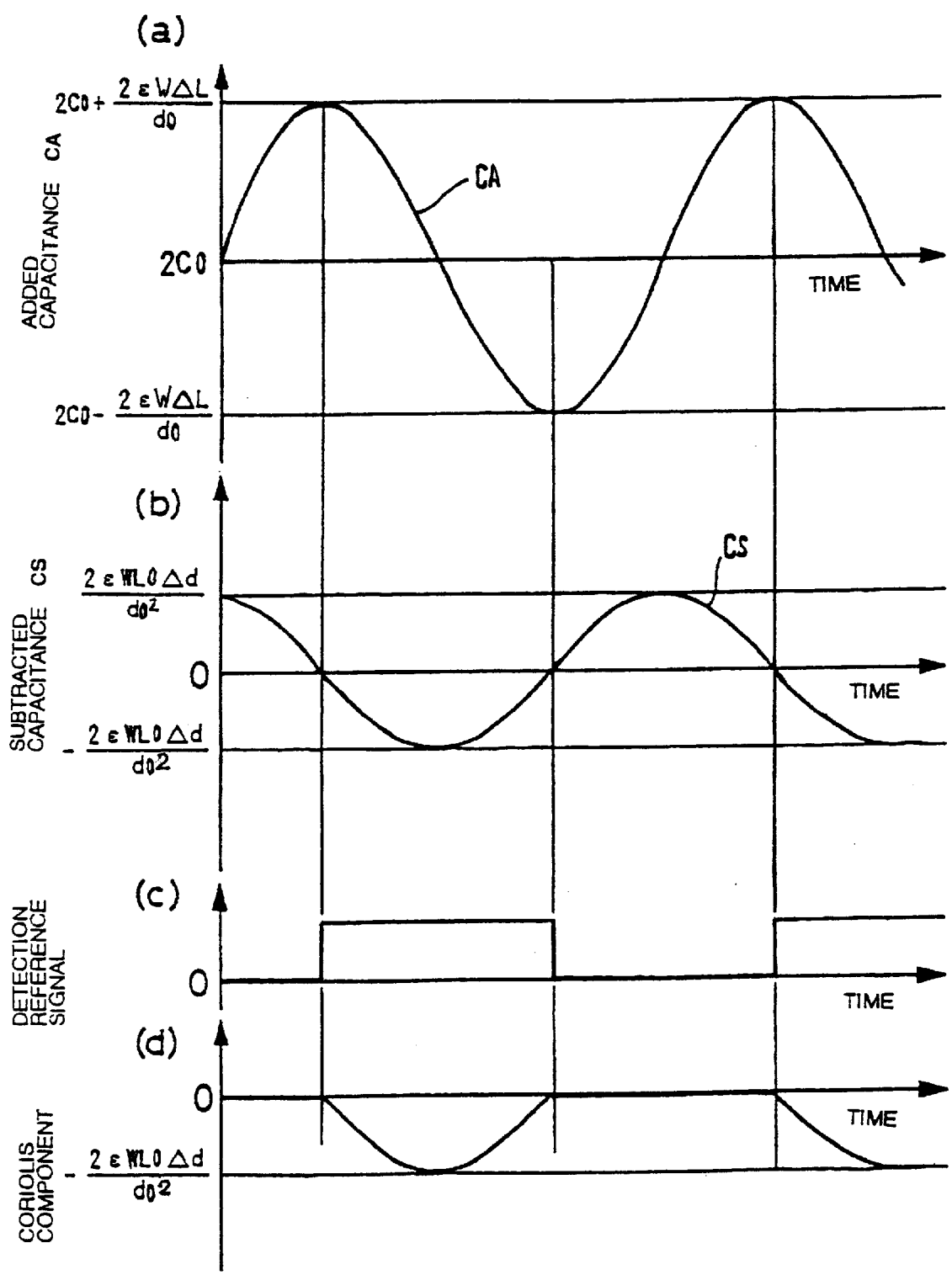
FIG. 9 is a waveform diagram showing the added capacitance, subtracted capacitance, detection reference signal, Coriolis component detected by the displacement detector when the movable body vibrates in both the directions of the arrow a and arrow F.

The detection operation by the displacement detector 35 is now more specifically discussed referring to FIGS. 7 through 9.

FIG. 7 is an enlarged view of the displacement detector 35, and here for convenience, L0 represents the length where the electrode plate 27B of the support-side antenna-like electrode 27 and the electrode plate 32B of the movable-side antenna-like electrode 32 extend coextensively, a change in length L0 represents ΔL0, ΔL represents an amplitude of displacement, d0 represents the narrow gap between the electrode plates 27B and the electrode plates 32B, Δd0 represents a change in the gap d0, and Δd represents an amplitude of displacement. Furthermore, W represents the height of the electrode plates 32B of the movable-side antenna-like electrode 32, ω represents the angular velocity of the driving signal VD applied to the movable body 28, and ε represents the dielectric constant of the atmosphere in the movable body 28.

The relationship between the change in the length ΔL0 and the amplitude of displacement ΔL and the relationship between the change in the gap Δd0 and the amplitude of displacement Δd are expressed in equation 4.

$$\begin{cases} \Delta L0 = \Delta L \sin\omega t \\ \Delta d0 = \Delta d \sin\omega t \end{cases} \quad \text{[Equation 4]}$$

The relationship between the effective area S0 and the length L0 and the relationship between the change in area ΔS0 and the change in length ΔL0 are expressed in equation 5.

$$\begin{cases} S0 = W \times L0 \\ \Delta S0 = W \times \Delta L0 = W \times \Delta L \sin\omega t \end{cases} \quad \text{[Equation 5]}$$

Capacitance Cu of the upper displacement detector 35 above the connecting portion 28B is computed as expressed in equation 6.

$$Cu = \epsilon \frac{W(L0 + \Delta L \sin\omega t)}{d0 - \Delta d \sin(\omega t + 90°)} \quad \text{[Equation 6]}$$

Capacitance Cd of the lower displacement detector 35 below the connecting portion 28B is computed as expressed in equation 7.

$$Cd = \epsilon \frac{W(L0 + \Delta L \sin\omega t)}{d0 + \Delta d \sin(\omega t + 90°)} \quad \text{[Equation 7]}$$

The denominators of equations 6 and 7 represent changes in gap d0 arising from the vibration of the movable body 28 in the direction of the arrow F, and the numerators represent changes in the effective area S0 arising from the change in the length L caused by the vibration of the movable body 28 in the direction of the arrow a. From equations 6 and 7, adding Cu and Cd determines capacitance when the movable body 28 vibrates in the direction of the arrow a, and subtracting Cd from Cu determines capacitance when the movable body 28 vibrates in the direction of the arrow F.

In this embodiment, a peripheral circuit to be described later allows the movable body 28 to vibrate greatly at resonance in the direction of the arrow a, and the movable body 28 vibrates in the direction of the arrow F 90 degrees off the driving signal VD.

An added capacitance CA obtained by adding capacitance Cu to capacitance Cd is expressed in equation 8.

$$CA = \quad \text{[Equation 8]}$$
$$Cu + Cd = \frac{\{d0 + \Delta d \sin(\omega t + 90°)\}\epsilon W(L0 + \Delta L \sin\omega t)}{d0^2 - \Delta d^2 \sin^2(\omega t + 90°)} +$$
$$\frac{\{d0 - \Delta d \sin(\omega t + 90°)\}\epsilon W(L0 + \Delta L \sin\omega t)}{d0^2 - \Delta d^2 \sin^2(\omega t + 90°)} =$$
$$\frac{2\epsilon W d0(L0 + \Delta L \sin\omega t)}{d0^2 - \Delta d^2 \sin^2(\omega t + 90°)}$$

The amplitude of displacement Δd caused by Coriolis force is small enough so that d0>>Δd, and Δd is thus negligible. Equation 8 is reduced to equation 9.

$$CA = Cu + Cd = \quad \text{[Equation 9]}$$
$$\frac{2\epsilon W d0(L0 + \Delta L \sin\omega t)}{d0^2} = \frac{2\epsilon W(L0 + \Delta L \sin\omega t)}{d0} =$$
$$\epsilon \frac{2WL0}{d0} + \epsilon \frac{2W\Delta L \sin\omega t}{d0} = 2C0 + \epsilon \frac{2W\Delta L \sin\omega t}{d0}$$
$$\text{where } C0 = \epsilon \frac{WL0}{do}$$
$$\text{where } C0 = \epsilon \frac{WLO}{d0}$$

A subtracted capacitance CS obtained by subtracting Cd from Cu is expressed in equation 10.

$$CS = \quad \text{[Equation 10]}$$
$$Cu - Cd = \frac{\{d0 + \Delta d \sin(\omega t + 90°)\}\epsilon W(L0 + \Delta L \sin\omega t)}{D0^2 - \Delta d^2 \sin^2(\omega t + 90°)} -$$
$$\frac{(d0 - \Delta d \sin(\omega t + 90°))\epsilon W(L0 + \Delta L \sin\omega t)}{d0^2 - \Delta d^2 \sin^2(\omega t + 90°)} =$$
$$\frac{2\epsilon W(L0 + \Delta L \sin\omega t)\Delta d \sin(\omega t + 90°)}{d0^2 - \Delta d^2 \sin^2(\omega t + 90°)}$$

The amplitude of displacement Δd caused by Coriolis force is small enough to be d0>>Δd, and Δd is thus negligible. Equation 10 is reduced to equation 11.

$$CS = Cu - Cd = \frac{2\epsilon W(L0 + \Delta L \sin\omega t)\Delta d \sin(\omega t + 90°)}{d0^2} \quad \text{[Equation 11]}$$

For example, when an angular velocity S does not act about the Z axis, the change in gap Δd0 in the direction of F is 0, and the added capacitance CA, obtained by adding Cu and Cd, vibrates with an amplitude of (2εWΔL/d0) centered at capacitance 2C0 as expressed in equation 9 (see FIG. 8(a)).

The subtracted capacitance CS, obtained by subtracting Cd from Cu, is zero as expressed in equation 11 (see FIG. 8(b)).

When an angular velocity S acts about the Z axis, the movable body 28 vibrates with a change in gap Δd0 in the direction of F. Since the added capacitance CA does not include the amplitude of displacement Δd as expressed in equation 9, the same waveform that is obtained with no angular velocity S acting is also obtained (see FIG. 9(a)).

The subtracted capacitance CS, including the amplitude of displacement Δd as expressed in equation 11, vibrates with an amplitude of (2εWL0ΔL/d0²) centered at 0 (see FIG. 9(b)).

FIG. 9 shows the waveforms of the added capacitance CA expressed in equation 9 and the subtracted capacitance CS expressed in equation 11, in which the waveform of the subtracted capacitance CS is shifted off the waveform of the added capacitance CA by 90°. By detecting and then integrating the subtracted capacitance CS with a detection reference signal (see FIG. 9(c)) which is 90° off the added capacitance CA, a Coriolis component only, proportional to the angular velocity, is thus picked up. As expressed in FIG. 9(d), the Coriolis component is output after it is amplified by a circuit.

In this way the angular velocity detection element 22 of this embodiment separately detects the displacements of the movable body 28 in the direction of a and in the direction of F using the upper and lower displacement detectors 35.

Referring to FIG. 2, the peripheral circuit is now discussed.

Designated 41 is an oscillator circuit constituting the oscillating means, and the oscillator circuit 41 is constituted by a voltage-controlled oscillator (so-called VCO) to be described later which changes the frequency f of the driving signal VD in accordance with a control signal VC. The oscillator circuit 41 outputs the driving signal VD to each vibration generator 33 in the angular velocity detection element 22.

Designated 42 is the subtracter circuit, and the subtracter circuit 42 outputs, as a subtracted signal VS, the angular velocity signal only of the angular velocity detectors 34 contained in detected signals Vin by subtracting one detected signal Vin from another detected signal Vin output by the angular velocity detection element 22. The subtracted signal VS is in value twice as large as the angular velocity signal output by each angular velocity detector 34.

Designated 43 is the adder circuit 43, and the adder circuit 43 outputs, as an added signal VA, the displacement signal only of the displacement detectors 35 by adding the detected signals Vin output by the angular velocity detection element 22. The added signal VA is in value twice as large as the displacement signal output by each displacement detector 35.

Designated 44 is a multiplier circuit, and the multiplier circuit 44 outputs a multiplied signal VM by multiplying the added signal VA output by the adder circuit 43 by the driving signal VD output by the oscillator circuit 41, and the multiplied signal VM represents a phase difference between the added signal VA and the driving signal VD.

A C-V converter circuit (not shown) constructed of semiconductor elements such as FETs is connected to the output of the angular velocity detection element 22.

Designated 45 is the frequency control circuit constituting the frequency control means, and the frequency control circuit 45 comprises an integrating circuit 46 for integrating the multiplied signal VM output by the multiplier circuit 44, and a control signal setting circuit 47 for setting the control signal VC in response to the integrated signal VI output by the integrating circuit 46.

Figure 10:
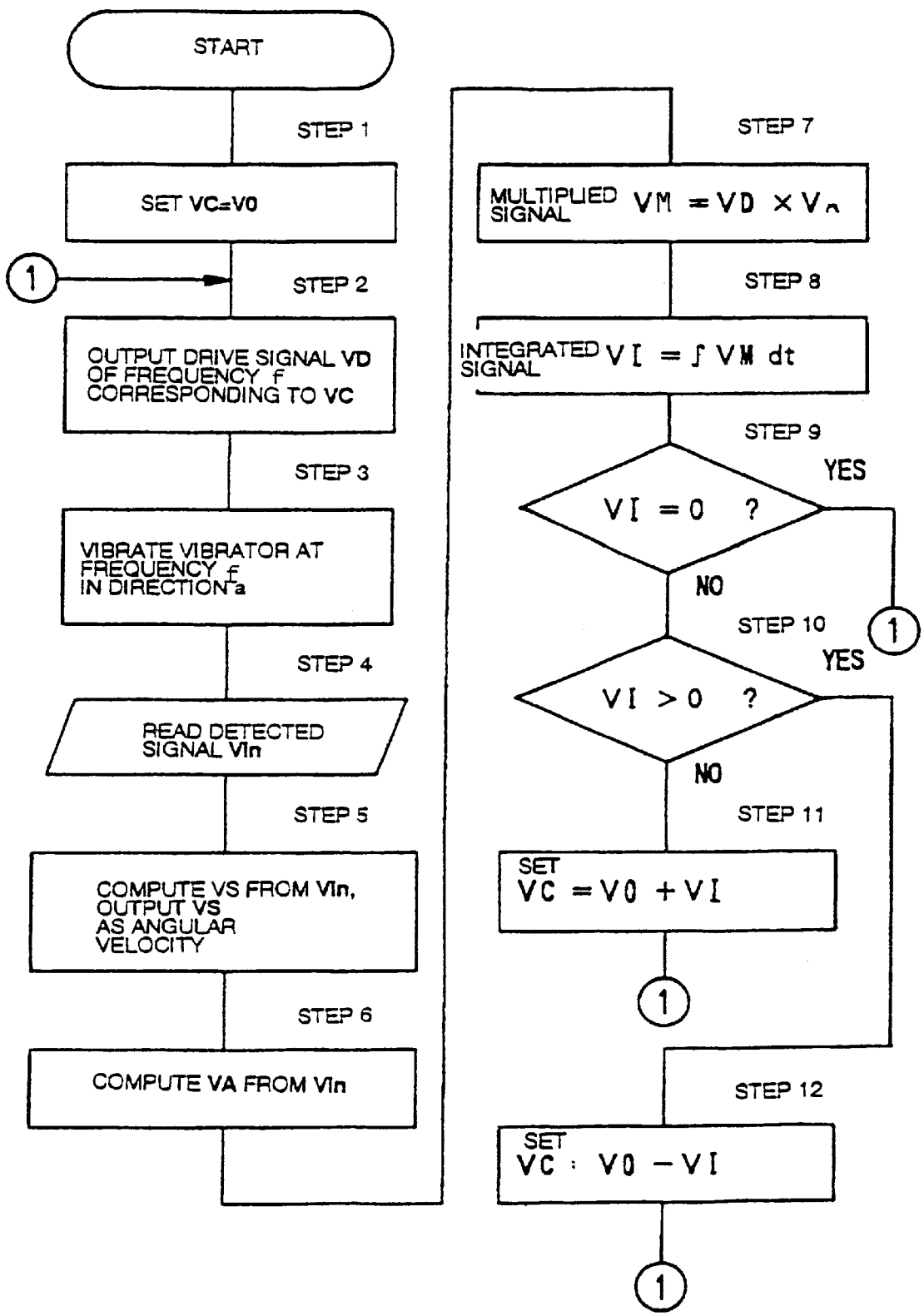
FIG. 10 is a flow diagram showing the operation of the angular velocity measuring device.

The control signal setting circuit 47 determines whether the integrated signal VI is zero, sets, as the control signal VC, the preset reference voltage V0 that is set to make the movable body 28 resonate when the integrated signal VI is zero, and sets, as the control signal VC, the value that is obtained by performing addition or subtraction on the integrated signal VI and the reference voltage V0 when the integrated signal VI is other than zero (see steps 9–12 in FIG. 10).

Designated 48 is a reference voltage supply, and the reference voltage supply 48 outputs the reference voltage V0. The reference voltage V0 is predetermined through computation, and when the reference voltage V0 is input to the oscillator circuit 41 as the control signal VC, the oscillator circuit 41 generates the driving signal VD of the frequency f. When the movable body 28 resonates under the driving signal, the movable body 28 vibrates theoretically 90 degrees off the driving signal VD in phase.

It is now assumed that the driving signal VD and the added signal VA are expressed as in equation 12.

$$\begin{cases} VD = \sin\theta \\ VA = \sin(\theta + \phi) \end{cases} \qquad \text{[Equation 12]}$$

where φ represents a phase difference.

The multiplied signal VM output by the multiplier circuit 44 is expressed in equation 13.

$$VM = VD \times VA = \sin\theta \times \sin(\theta + \phi) \qquad \text{[Equation 13]}$$

To make the movable body 28 resonate, as already described in connection with the conventional art, the displacement signal (added signal VA) is 90 degrees off the driving signal VD in phase, and φ=−90°, and equation 13 is reduced to equation 14 as follows.

$$VM = \sin 2\theta \qquad \text{[Equation 14]}$$

When the phase is off φ (−90 degrees) in phase by ρ equation 15 is derived.

$$\begin{cases} VM = \sin\theta \times \sin(\theta + \phi + \rho) \\ \quad \approx \sin 2\theta - VDC \\ VM = \sin\theta \times \sin(\theta + \phi - \rho) \\ \quad \approx \sin 2\theta + VDC \end{cases} \qquad \text{[Equation 15]}$$

where VDC is a constant.

When the movable body 28 of the angular velocity detection element 22 is at resonance, namely when the phase difference between the driving signal VD and the displacement signal (added signal VA) is −90 degrees, no change in direct current component takes place in the multiplied signal VM as understood from equation 14. However, when the resonance state is destroyed, the direct current component of the constant VDC is added or subtracted in the multiplied signal VM as understood from equation 15.

This embodiment of the present invention focuses on this, and the frequency f of the driving signal VD output by the oscillator circuit 41 is adjusted such that the phase difference between the driving signal VD and the displacement signal (added signal VA) is 90 degrees to make the movable body 28 vibrate at resonance.

The angular velocity measuring device of this embodiment is constructed as described above, and the angular velocity detection element 22 has no particular difference in the basic operation from the conventional art.

Figure 11:
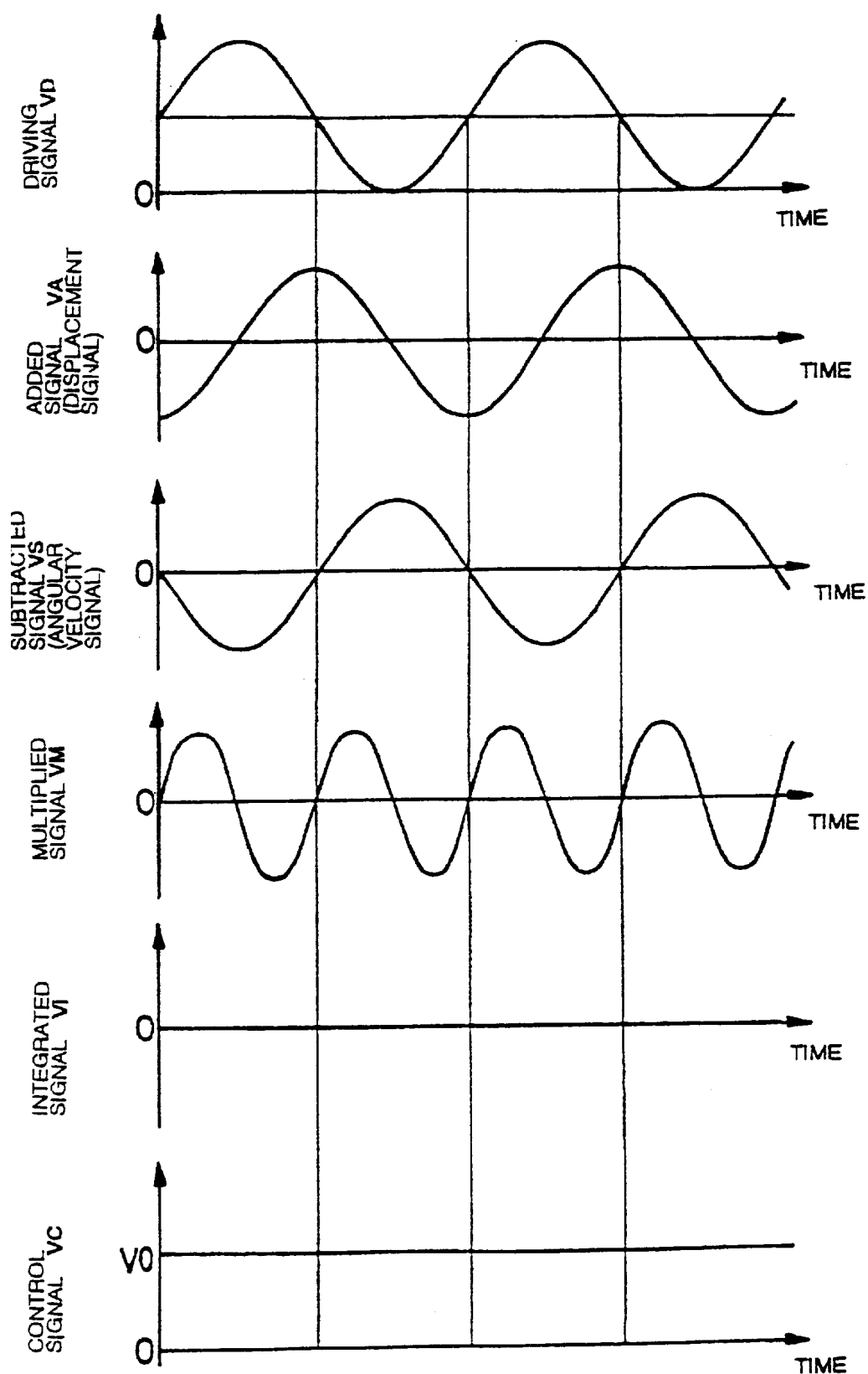
FIG. 11 is a waveform diagram showing the output waveforms from the oscillator circuit, adder circuit, subtracter circuit, multiplier circuit, integrating circuit, and control signal setting circuit when the movable body is at resonance.
Figure 12:
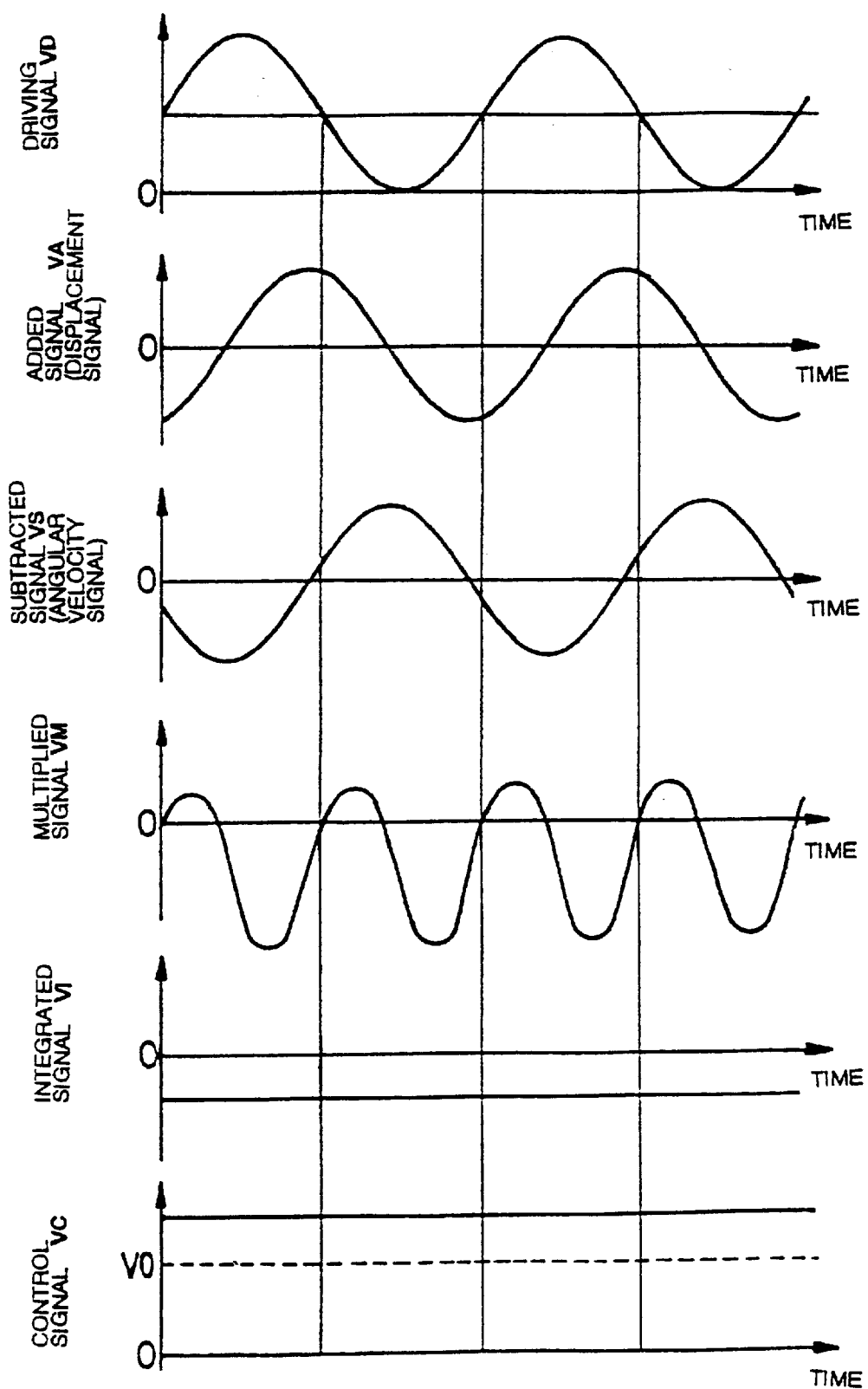
FIG. 12 is a waveform diagram showing the output waveforms from the oscillator circuit, adder circuit, subtracter circuit, multiplier circuit, integrating circuit, and control signal setting circuit when the movable body is off resonance.
Figure 13:
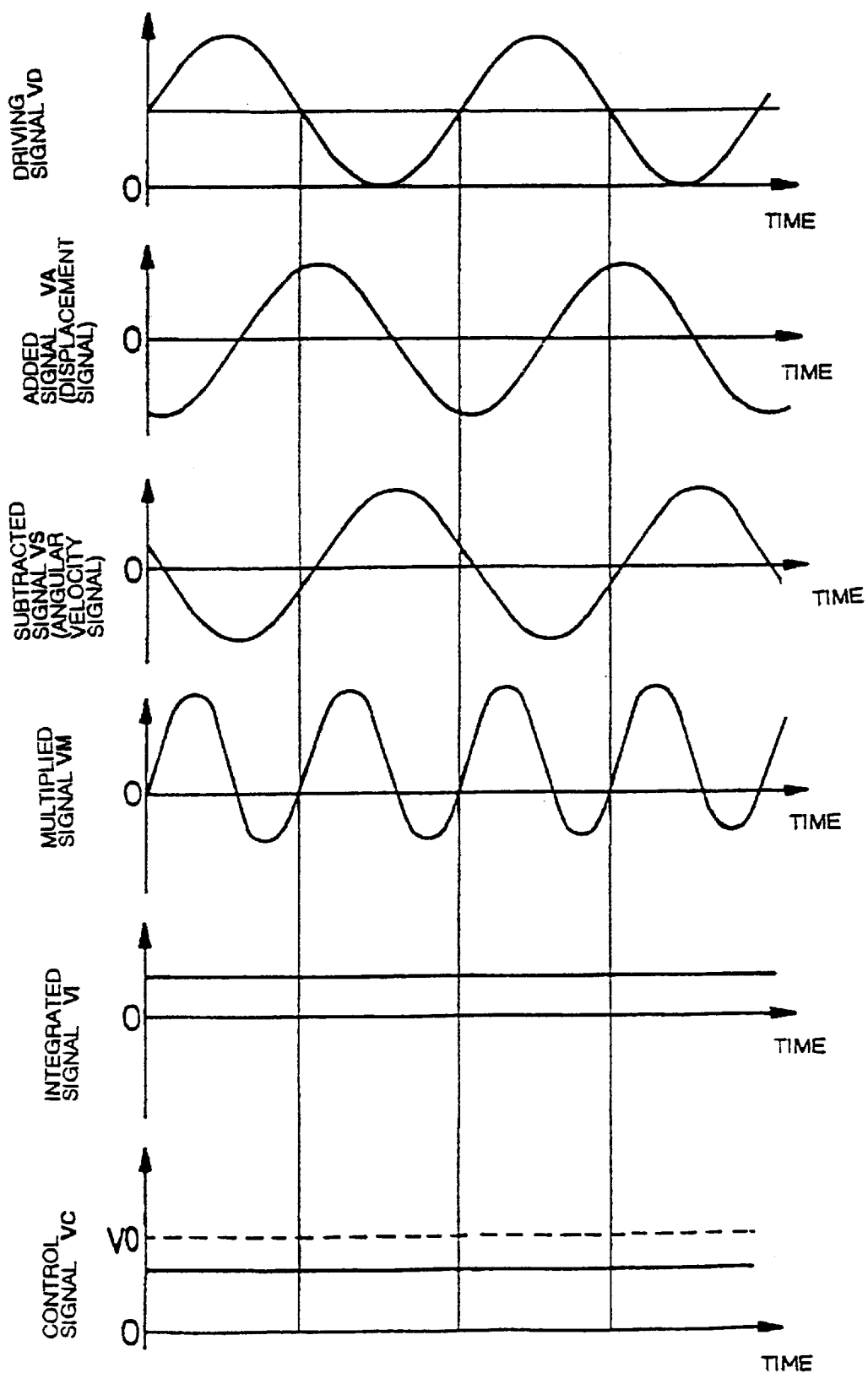
FIG. 13 is a waveform diagram showing the output waveforms from the oscillator circuit, adder circuit, subtracter circuit, multiplier circuit, integrating circuit, and control signal setting circuit when the movable body is off resonance.
Figure 14:
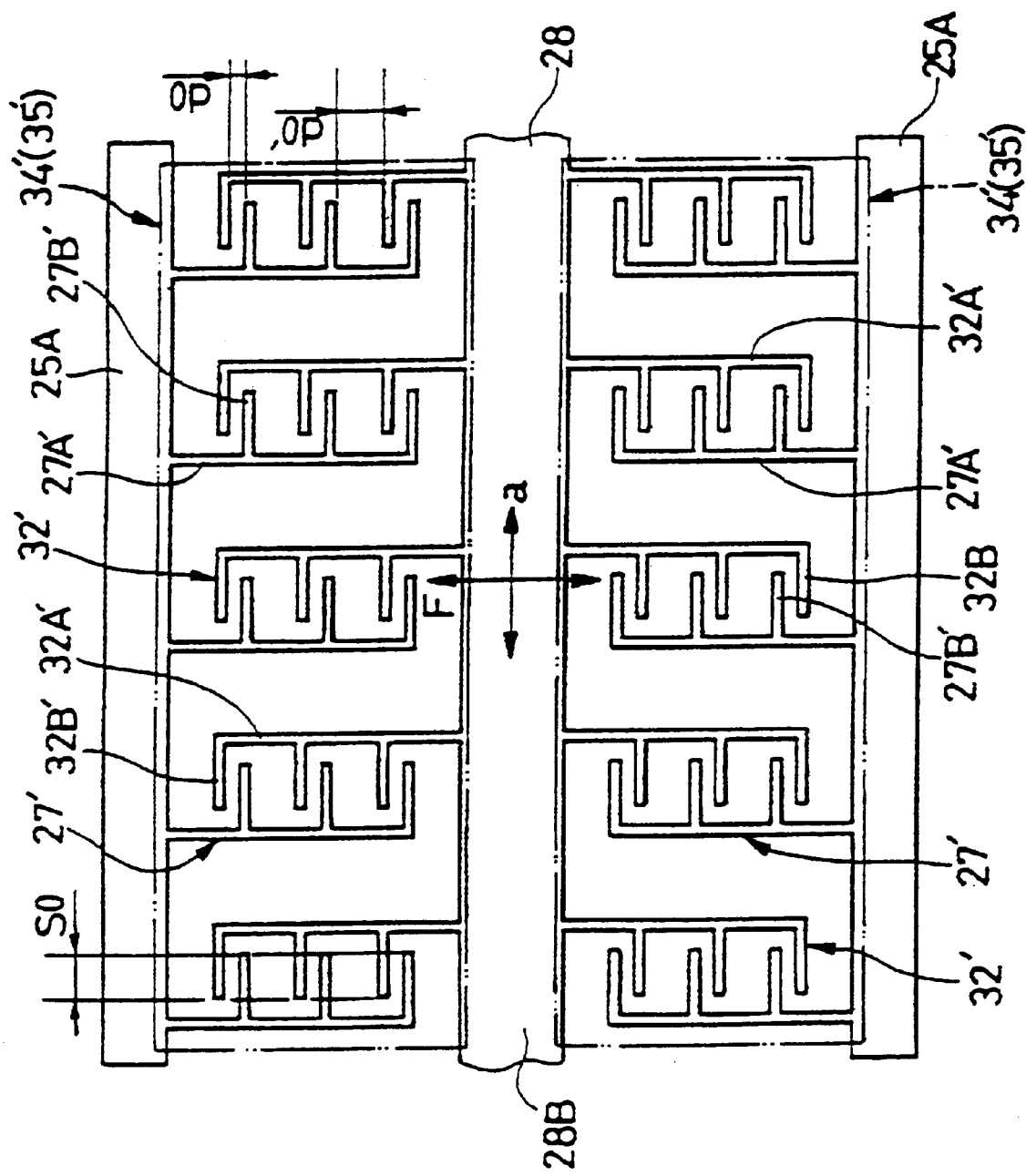
FIG. 14 is a plan view showing the first modification of the angular velocity detection element viewed from the same angle as in FIG. 4.

The operation of the angular velocity measuring device 21 is now discussed referring to an operational flow diagram in FIG. 10, and waveform diagrams shown in FIGS. 11 through 13.

In step 1, the control signal VC is set to the reference voltage V0 to set the frequency f of the driving signal VD output by the oscillator circuit 41.

In step 2, the driving signal VD of the frequency f from the oscillator circuit 41 is output to the vibration generators 33 of the angular velocity detection element 22, and in step 3, the movable body 28 is vibrated at the frequency f in the direction of the arrow a.

When an angular velocity S acts on the angular velocity detection element 22 about the Z axis with the movable body 28 vibrating in the direction of the arrow a, the movable body 28, subject to Coriolis force, is displaced in the direction of F.

In step 4, the detected signals Vin output by the angular velocity detectors 34 (displacement detectors 35) above and below the movable body 28 of the angular velocity detection element 22 are read, and in step 5, when the read detected signals Vin are input to the subtracter circuit 42, the subtracter circuit 42 outputs the subtracted signal VS (angular velocity signal) indicative of the displacement of the movable body 28 in the direction of F only.

The subtracted signal VS indicates the displacement of the movable body 28 in the direction of F by Coriolis force, and shows the magnitude of the angular velocity S added to the angular velocity detection element 22.

In step 6, the detected signals Vin are input to the adder circuit 43, and the adder circuit 43 outputs the added signal VA (displacement signal) indicative of the vibration of the movable body 28 in the direction of a only.

In step 7, the multiplied signal VM is computed by multiplying the added signal VA and the driving signal VD through the multiplier circuit 44, and in step 8, the integrating circuit 46 integrates the multiplied signal VM to obtain the integrated signal VI.

In step 9, a determination is made of whether the integrated signal VI is zero, and when the answer is "YES", the phase difference between the added signal VA and the driving signal VD is −90 degrees, and the movable body 28 vibrates at resonance, and the sequence returns to step 2, where the control signal VC is set to the reference voltage V0.

When the answer is "NO" in step 9, the phase difference between the added signal VA and the driving signal VD is changed from −90 degrees, and the movable body 28 vibrates out of resonance, and the sequence returns to step 10.

In step 10, a determination is made of whether the integrated signal VI is greater than zero, and when the answer is "NO", there is a lead from −90 degrees in phase difference, the control signal VC is set to (V0+V1) in step 11, and the sequence returns to step 2, where the process with the control signal VC set to (V0+V1) is started (see FIG. 12).

When the answer is "YES" in step 10, there is a lag from −90 degrees in phase difference, the control signal VC is set to (V0−V1) in step 12, and the sequence returns to step 2, where the process with the control signal VC set to (V0−V1) is started (see FIG. 13).

In the angular velocity measuring device 21 according to this embodiment of the present invention, the multiplied signal VM is determined correspondingly to the phase difference between the driving signal VD and the added signal VA, by multiplying the driving signal VD output by the oscillator circuit 41 and the added signal VA (displacement signal) output by the adder circuit 43 through the multiplier circuit 44. The frequency control circuit 45 integrates the multiplied signal VM through the integrating circuit 46, and determines through the control signal setting circuit 47 whether the integrated signal VI is zero.

In this way a determination is made whether the phase difference between the driving signal VD and the added signal VA is −90 degrees and a determination is thus made of whether the movable body 28 of the angular velocity detection element 22 vibrates at resonance. When the movable body 28 does not vibrate at resonance, the control signal setting circuit 47 sets the control signal VC to cause the movable body 28 to vibrate at resonance. In response to the control signal VC, the oscillator circuit 41 adjusts the frequency f of the driving signal VD so that the frequency f matches the natural oscillation frequency of the angular velocity detection element 22.

The angular velocity detection element 22 thus allows the movable body 28 to vibrate at resonance, enlarging the amplitude of vibration of the movable body 28 in the direction of a, and thereby increasing the detection sensitivity of the angular velocity measuring device 21.

Even when the natural oscillation frequency of the angular velocity detection element 22 varies because of aging or the like, the frequency f of the driving signal VD is feedback-controlled so that the movable body 28 vibrates at resonance, and the reliability of the angular velocity measuring device 21 is thus increased.

Since the frequency adjustment of the angular velocity measuring device 21 is automatically performed in this embodiment, the frequency adjustment step for the oscillator circuit which is needed to connect the angular velocity detection element to its peripheral circuit in the conventional angular velocity measuring device 1 is dispensed with, and the efficiency in the assembly of the angular velocity measuring device 21 is increased.

Even when the peripheral circuit is subject to temperature change and aging in the angular velocity measuring device 21 of this embodiment, the frequency and amplitude of the driving signal VD or the frequency or amplitude of the driving signal VD is feedback controlled, and the reliability of the angular velocity measuring device 21 is thus increased.

In this embodiment, the frequency f of the driving signal VD which is output by the oscillator circuit 41 to the vibration generators 33, 33 of the angular velocity detection element 22 is feedback controlled as described above so that the frequency f of the driving signal VD is set to match the natural oscillation frequency of the angular velocity detection element 22. As a result, the movable body 28 of the angular velocity detection element 22 vibrates greatly at resonance in the direction of the arrow a, and the detection sensitivity of the angular velocity detection element 22 is thus heightened.

The displacement detector 35 is included in the angular velocity detector 34 in this embodiment, but the present invention is not limited to this, and the angular velocity detector 34 and the displacement detector 35 may be separately organized or integrated into a unitary unit. For example, as shown in a first modification shown in FIG. 14, a angular velocity detector 34' (displacement detector 35') has a post 32A' (27A') having a plurality of electrode plates 32B' (27B') arranged in a comb-shaped fashion on one side only.

Figure 15:
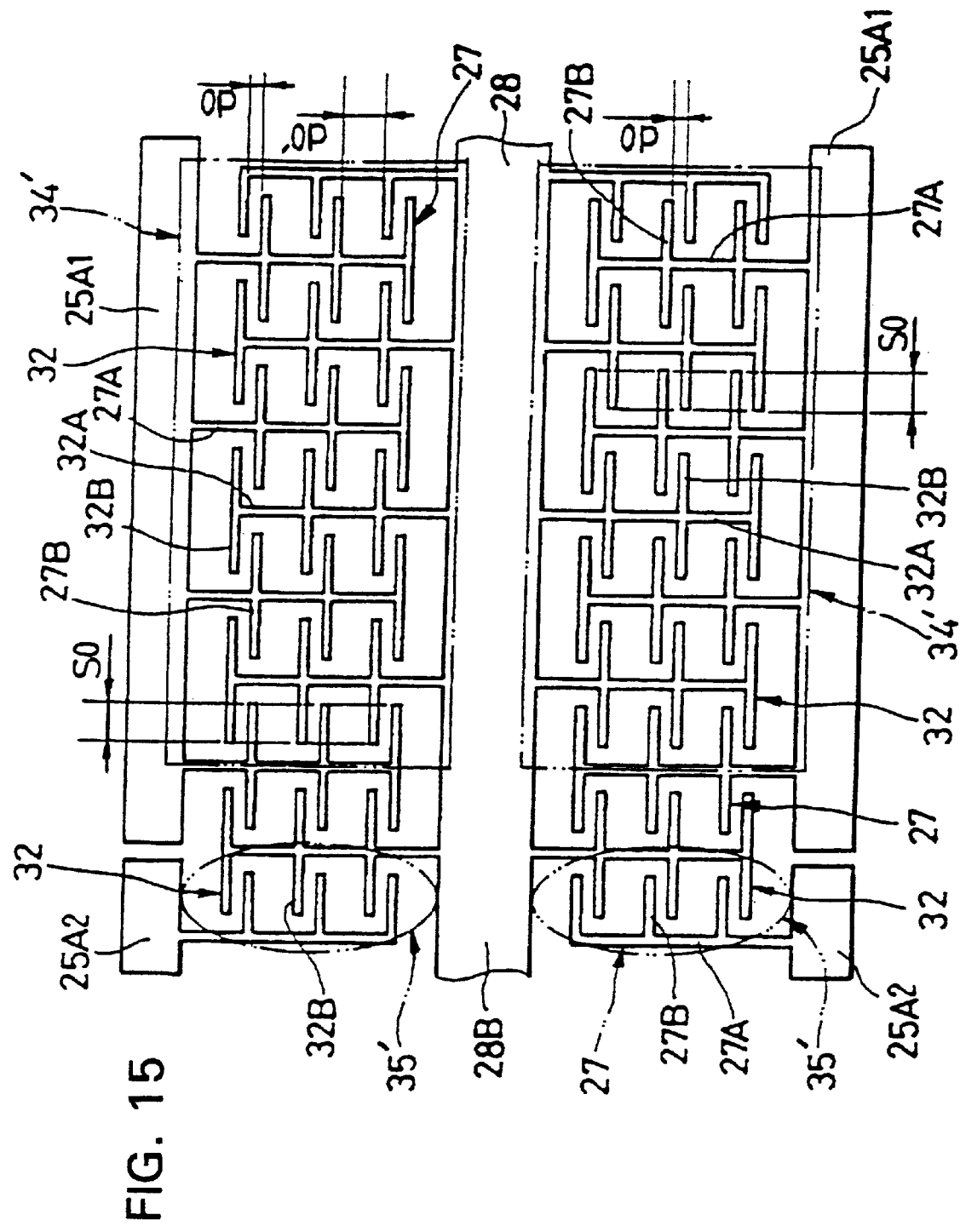
FIG. 15 is a plan view showing the second modification of the angular velocity detection element viewed from the same angle as in FIG. 4.
Figure 16:
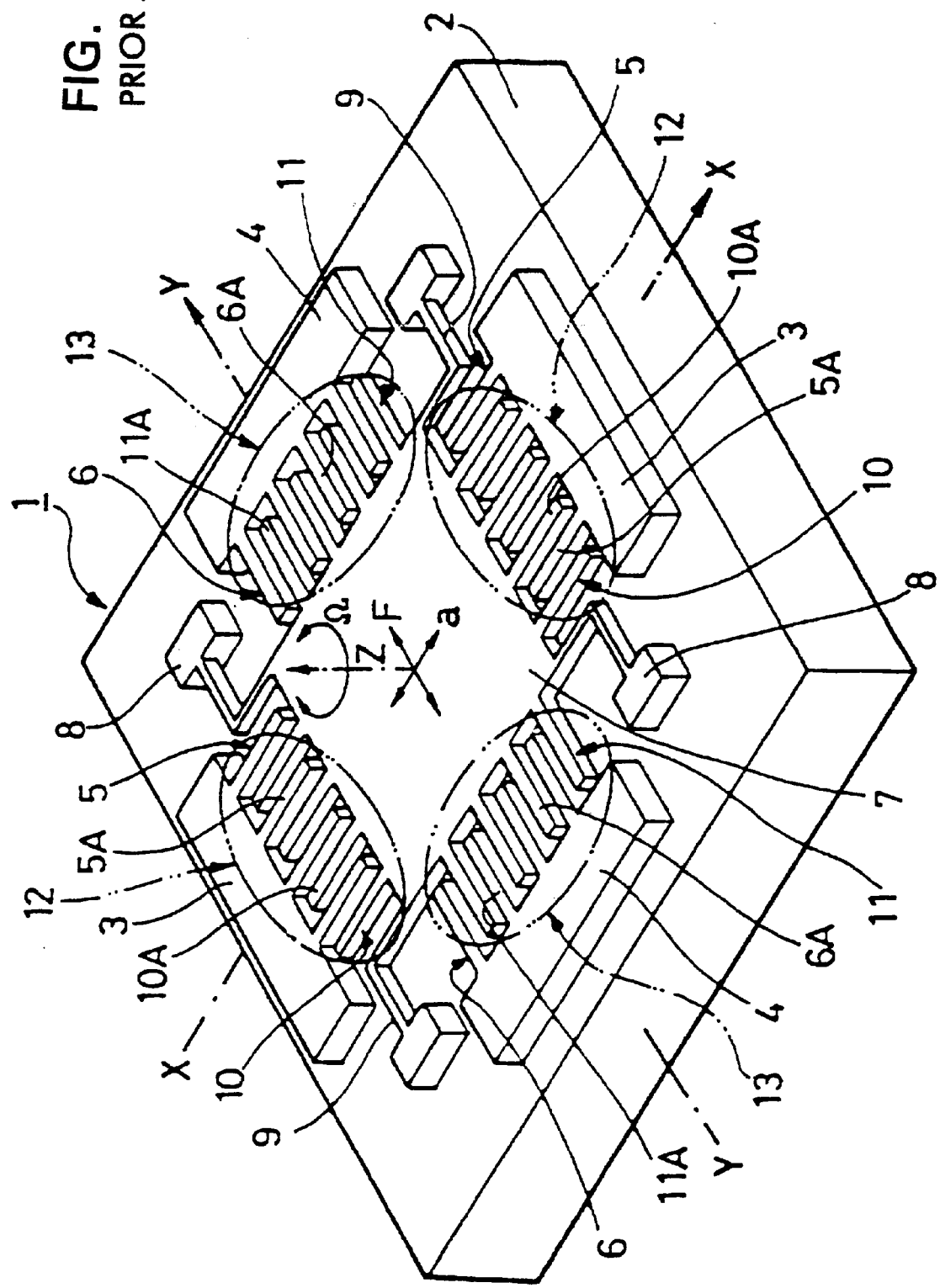
FIG. 16 is a perspective view showing the construction of the angular velocity detection element of the conventional art.
Figure 17:
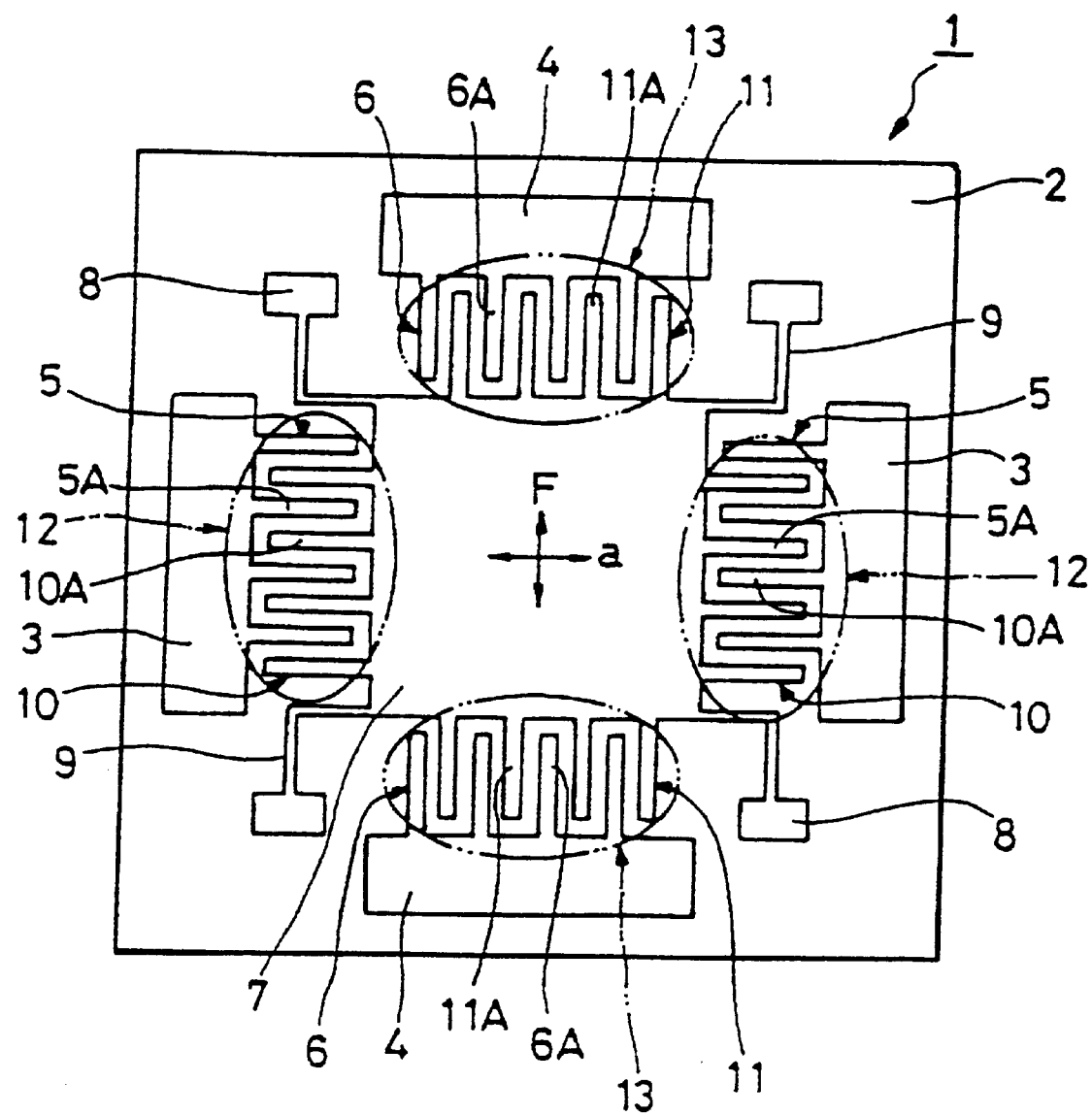
FIG. 17 is a plan view showing the conventional angular velocity detection element of FIG. 16.

Referring to a second modification shown in FIG. 15, the base portion 25A of the support body 25 may be split into base portions 25A1 and 25A2, corresponding to the angular velocity detector 34' and the displacement detector 35' so that signal processings are separately made in respective peripheral circuits. In such a case, the peripheral circuits are designed to match each other in characteristics.

Although the oscillator circuit 41 outputs a sinusoidal wave as the driving signal VD, it may output a rectangular wave as the driving wave VD, or any other suitable wave form. Preferably the oscillator circuit 41 is of the voltage-controlled oscillator circuit type.

As is understood form the aforementioned explanation, the angular velocity detection element of the present invention comprises the vibration generator for vibrating the movable body in one direction by means of the support-side electrodes and the movable-side electrodes, the pair of displacement detectors for detecting the displacement of the movable body in the one direction caused by the vibration generator, and the pair of angular velocity detectors for detecting as an angular velocity the displacement of the movable body caused by Coriolis force in the perpendicular direction, wherein each angular velocity detector detects the displacement of the movable body in the perpendicular direction as the magnitude of angular velocity, and each displacement detector detects the displacement of the movable body vibrated in the one direction by the vibration generator. Even if a block is commonly shared, in the above arrangement, by the angular velocity detector and the displacement detector, the angular velocity signal and the displacement signal, contained in the detected signals output by the angular velocity detection element are separately picked up.

Each displacement detector detects the displacement of the movable body in one direction as a capacitance arising from a change in the effective area between the electrodes or the gap between the electrodes, and each angular velocity detector detects the displacement of the movable body in the perpendicular direction as a capacitance arising from a change in the gap between the electrodes or the effective area between the electrodes, and when the displacement signals output by the displacement detectors increase or decrease in response to the vibration, the angular velocity signals output by the angular velocity detectors remain unchanged, and when the movable body is displaced in the perpendicular direction, the angular velocity signals output by the angular velocity detectors in response to the displacement increase or decrease, and the displacement signals from the detectors remain unchanged. Even if a block is commonly shared, in the above arrangement, by the angular velocity detector and the displacement detector, the angular velocity signal and the displacement signal, contained in the detected signals output by the angular velocity detection element are separately picked up.

The support-side electrode and the movable-side electrode may be formed in an antenna-like configuration, a change in capacitance arising from the effective area between the electrodes is used to detect the displacement of the movable body in the one direction, and a change in capacitance arising from the gap between the electrodes is used to detect the displacement of the movable body in the perpendicular direction by Coriolis force.

The displacement computing means detects the displacement of the movable body of the angular velocity detection element in response to the vibration, and the frequency of the driving signal output by the oscillating means via the multiplying means and frequency control means based on the displacement signal and the driving signal is feedback controlled, and the phase difference between the displacement signal output by the displacement computing means and the driving signal output by the oscillating means is automatically set to 90 degrees, thereby causing the movable body to vibrate at resonance. In this way the angular velocity detection element achieves a large amplitude vibration in the movable body, and heightens the detection sensitivity against angular velocity applied thereto.

Even when the angular velocity detection element ages varying its natural oscillation frequency, the frequency of the driving signal output by the oscillating means is set to match the natural oscillation frequency, and the reliability of the angular velocity measuring device is thus increased.

When the angular velocity detection element is connected to its peripheral devices during an assembly stage, the frequency adjustment step for the oscillating means is dispensed with, and the manufacturing efficiency is heightened.

The oscillating means comprises the voltage-controlled oscillator circuit for varying the frequency of the driving signal in response to the control signal. The frequency control means comprises the integrating circuit for integrating the multiplied signal output by the multiplying means, and the control signal setting circuit for determining whether an integrated signal output by the integrating circuit is zero, for setting, as the control signal, a preset reference signal that causes a phase difference of 90 degrees between the driving signal and the displacement signal when the integrated signal is zero, and for setting, as the control signal, a value that is obtained by performing addition or subtraction between the integrated signal and the reference signal when the integrated signal is not zero. The frequency of the driving signal output by the oscillating means is set such that the phase difference between the driving signal and the displacement signal is 90 degrees, and the frequency of the driving signal is feedback controlled to match the natural oscillation frequency of the angular velocity detection element, allowing the movable body to continuously vibrate at resonance.

The displacement computing means comprises the adder circuit. The angular velocity computing means comprises the subtracter circuit. The displacement detectors are paired with respect to the movable body. The angular velocity detectors are paired with respect to the movable body. The angular velocity computing means computes the angular velocity signals only of the displacement detectors and the displacement computing means computes the displacement signals only of the displacement detectors, and the angular velocity signals and the displacement signals are separately picked up.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity detection element, comprising:
    a substrate;
    a pair of spaced support bodies arranged on the substrate and having at least a pair of support-side electrodes that face each other;
    a movable body, disposed between the support bodies, having at least a pair of movable-side electrodes facing the support-side electrodes; and
    a vibration generator for vibrating the movable body in one direction, the pair of support-side electrodes and the pair of movable-side electrodes being structured and arranged such as to constitute a pair of displacement detectors which detects the displacement of the movable body, and to constitute a pair of angular velocity detectors for detecting, as an angular velocity, a displacement perpendicular to the one direction in which the movable body vibrates when an angular velocity acts on the movable body.

2. An angular velocity detection element according to claim 1, wherein the displacement detector detects the displacement of the movable body, based on a change in capacitance between the support-side electrodes and the movable-side electrodes when an effective area between the support-side electrodes and the movable-side electrodes or a gap between the support-side electrodes and the movable-side electrodes changes, and
    wherein the angular velocity detector detects the angular velocity based on a change in capacitance between the support-side electrodes and the movable-side electrodes when an effective area between the support-side electrodes and the movable-side electrodes or a gap between the support-side electrodes and the movable-side electrodes changes.

3. An angular velocity detection element according to claim 1, wherein each support-side electrode is constructed in an antenna-like configuration and has a plurality of posts extending from the support body in a direction perpendicular to the support body and a plurality of electrode plates, each extending in one direction from both sides of each post, and wherein each movable-side electrode is constructed in an antenna-like configuration and has a plurality of posts that extend in the direction of the same axis as the respective posts of the support-side electrode, and a plurality of electrode plates, each extending from both sides of each post, and facing the respective electrode plates of the support-side electrode with a gap therebetween.

4. An angular velocity measuring device comprising:

an angular velocity detection element, the angular velocity detection element comprising:
a substrate;
a pair of spaced support bodies arranged on the substrate and having at least a pair of support-side electrodes that face each other;
a movable body, disposed between the support bodies, having at least a pair of movable-side electrodes facing the support-side electrodes; and
a vibration generator for vibrating the movable body in one direction, the pair of support-side electrodes and the pair of movable-side electrodes being structured and arranged such as to constitute a pair of displacement detectors which detects, as a change in capacitance, a displacement of the movable body in the one direction when the vibration generator imparts a vibration in the one direction to the movable body, and to constitute a pair of angular velocity detectors for detecting, as a change in capacitance, a displacement perpendicular to the one direction when an angular velocity acts on the movable body;
oscillating means for outputting a driving signal having a frequency corresponding to a control signal in order to impart a vibration in the one direction to the movable body of the angular velocity detection element;
displacement computing means for computing the displacement of the movable body based on the change in capacitance taking place in the angular velocity detection element with the oscillating means imparting the vibration in the one direction to the movable body of the angular velocity detecting means;
angular velocity computing means for computing the magnitude of angular velocity acting on the movable body based on the change in capacitance taking place in the angular velocity detection element when the angular velocity acts on the angular velocity detection element;
multiplying means for multiplying a displacement signal and the driving signal in order to compute a phase difference therebetween, wherein the displacement signal is output by the displacement computing means and the driving signal is output by the oscillating means; and
frequency control means for outputting the control signal for controlling the frequency of the driving signal in response to the inputting of a multiplied signal from the multiplying means so that a phase difference of 90 degrees takes place between the driving signal output by the oscillating means and the displacement signal output by the displacement computing means.

5. An angular velocity measuring device according to claim 4, wherein the oscillating means comprises a voltage-controlled oscillator circuit which varies the frequency of the driving signal output to the angular velocity detection element in response to the control signal output by the frequency control means, and wherein the frequency control means comprises an integrating circuit for integrating the multiplied signal output by the multiplying means, and a control signal setting circuit for determining whether an integrated signal output by the integrating circuit is zero, for setting, as the control signal, a preset reference signal that causes a phase difference of 90 degrees between the driving signal and the displacement signal when the integrated signal is zero, and for setting, as the control signal, a value that is obtained by performing addition or subtraction between the integrated signal and the reference signal when the integrated signal is not zero.

6. An angular velocity measuring device according to claim 4, wherein the displacement computing means comprises an adder circuit which outputs the displacement signal only output by the displacement detectors by adding a capacitance taking place between one of left-hand and right-hand support bodies and the movable body to a capacitance taking place between the other of the left-hand and right-hand support bodies and the movable body, and wherein the angular velocity computing means comprises a subtracter circuit which outputs the angular velocity signal only output by the angular velocity detectors by subtracting the capacitance taking place between one of left-hand and right-hand support bodies and the movable body from a capacitance taking place between the other of the left-hand and right-hand support bodies and the movable body.

7. An angular velocity measuring device according to claim 4, wherein the displacement detector detects the displacement of the movable body, based on a change in capacitance between the support-side electrodes and the movable-side electrodes when an effective area between the support-side electrodes and the movable-side electrodes or a gap between the support-side electrodes and the movable-side electrodes changes, and wherein the angular velocity detector detects the angular velocity based on a change in capacitance between the support-side electrodes and the movable-side electrodes when an effective area between the support-side electrodes and the movable-side electrodes or a gap between the support-side electrodes and the movable-side electrodes changes.

8. An angular velocity measuring device according to claim 7, wherein each support-side electrode is constructed in an antenna-like configuration and has a plurality of posts extending from the support body in a direction perpendicular to the support body, and a plurality of electrode plates, each extending in one direction from both sides of each post, and wherein each movable-side electrode is constructed in an antenna-like configuration and has a plurality of posts that extend in the direction of the same axis as the respective posts of the support-side electrode, and a plurality of electrode plates, each extending from both sides of each post, and facing the respective electrode plates of the support-side electrode with a gap therebetween.

* * * * *